United States Patent
Horn et al.

(10) Patent No.: US 11,784,758 B2
(45) Date of Patent: Oct. 10, 2023

(54) HYBRID AUTOMATIC REPEAT REQUEST (HARQ) PROCEDURE USING MULTIPLE BEAMS IN A WIRELESS WIDE AREA NETWORK (WWAN)

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/179,324

(22) Filed: Feb. 18, 2021

(65) Prior Publication Data
US 2022/0263602 A1 Aug. 18, 2022

(51) Int. Cl.
*H04L 1/1812* (2023.01)
*H04W 72/044* (2023.01)
(Continued)

(52) U.S. Cl.
CPC ......... *H04L 1/1812* (2013.01); *H04W 72/046* (2013.01); *H04W 72/23* (2023.01); *H04W 72/541* (2023.01)

(58) Field of Classification Search
CPC .... H04B 7/0408; H04B 7/0695; H04B 7/088; H04L 1/1812; H04L 1/1893;
(Continued)

(56) References Cited

U.S. PATENT DOCUMENTS 7,817,088 B2 * 10/2010 Lou ............... H04B 7/0623
342/373
8,594,053 B2 * 11/2013 Kim ............... H04W 72/046
342/359
(Continued)

FOREIGN PATENT DOCUMENTS

AU  2011375057 A1 * 2/2014 ........... H04B 7/0408
AU  2011375057 B2 * 11/2016 ........... H04B 7/0408
(Continued)

OTHER PUBLICATIONS

Ericsson: "Reliability and Dynamic Switch for MBS", 3GPP TSG-RAN WG2 #113e, 3GPP Draft, Tdoc R2-2101172, 3rd Generation Partnership Project (3GPP), Mobile Competence Centre, 650, Route Des Lucioles, F-06921 Sophia-Antipolis Cedex, France, vol. RAN WG2, No. Electronic Meeting, Jan. 25, 2021-Feb. 5, 2021, 8 Pges, Jan. 14, 2021 (Jan. 14, 2021), XP051972835, Retrieved from the Internet: URL: https://ftp.3gpp.org/tsg_ran/WG2_RL2/TSGR2_113-e/Docs/R2-2101172.zip R2-2101172 -Reliability and Dynamic Switch for MBS.docx [retrieved on Jan. 14, 2021] p. 5.
(Continued)

*Primary Examiner* — Eric Nowlin
(74) *Attorney, Agent, or Firm* — Arun Swain

(57) ABSTRACT

This disclosure provides systems, methods, and apparatus, including computer programs encoded on computer-readable media, for implementing a Hybrid Automatic Repeat Request (HARQ) protocol using multiple beams. In some aspects, the UE may receive a first HARQ transmission from a base station (BS) via a first beam, and may transmit a HARQ feedback to the first BS. The BS may receive the HARQ feedback message and determine whether to transmit a HARQ retransmission associated with the first HARQ transmission via the first beam or via a different beam (such as a second beam) based on beam-specific conditions. The BS may provide a HARQ retransmission beam indication to
(Continued)

the UE indicating that the HARQ retransmission will be transmitted via the second beam. The BS may transmit the HARQ retransmission via the second beam. The UE may receive the HARQ retransmission associated with the first HARQ transmission via the second beam.

27 Claims, 10 Drawing Sheets

(51) Int. Cl.
*H04W 72/23* (2023.01)
*H04W 72/541* (2023.01)

(58) Field of Classification Search
CPC ............ H04L 1/1896; H04W 72/042; H04W 72/046; H04W 72/082
See application file for complete search history.

(56) References Cited

U.S. PATENT DOCUMENTS

| | | | | |
|---|---|---|---|---|
| 9,571,171 B2* | 2/2017 | Kim | | H04B 7/0408 |
| 9,591,645 B2* | 3/2017 | Seol | | H04B 7/0695 |
| 9,843,974 B1* | 12/2017 | Touboul | | H04W 36/0079 |
| 9,900,891 B1* | 2/2018 | Islam | | H04W 36/0079 |
| 9,979,513 B2* | 5/2018 | Seo | | H04W 72/1289 |
| 10,141,986 B2* | 11/2018 | Yu | | H04B 7/0639 |
| 10,498,408 B2* | 12/2019 | Yu | | H04W 72/0446 |
| 10,630,429 B2* | 4/2020 | Jung | | H04L 1/201 |
| 10,638,483 B2* | 4/2020 | Zhou | | H04B 7/0695 |
| 10,687,335 B2* | 6/2020 | Islam | | H04L 5/0048 |
| 10,784,950 B2* | 9/2020 | Kang | | H04B 7/063 |
| 10,812,161 B2* | 10/2020 | Mueck | | H04B 7/0623 |
| 10,863,527 B2* | 12/2020 | Kwon | | H04W 72/0413 |
| 10,945,294 B2* | 3/2021 | Lei | | H04L 1/1819 |
| 10,966,205 B2* | 3/2021 | Tang | | H04W 74/0833 |
| 11,032,823 B2* | 6/2021 | Islam | | H04B 7/0617 |
| 11,038,564 B2* | 6/2021 | Tang | | H04W 52/48 |
| 11,228,349 B2* | 1/2022 | Ryu | | H04B 7/0632 |
| 11,233,557 B2* | 1/2022 | Lee | | H04B 7/0417 |
| 11,246,147 B2* | 2/2022 | Zhang | | H04W 28/0278 |
| 11,258,547 B2* | 2/2022 | Zhou | | H04B 7/0695 |
| 11,329,713 B2* | 5/2022 | Kang | | H04B 7/088 |
| 11,419,173 B2* | 8/2022 | Deenoo | | H04B 7/0695 |
| 11,445,561 B2* | 9/2022 | Lei | | H04W 72/046 |
| 11,451,267 B2* | 9/2022 | Kim | | H04B 7/0617 |
| 11,582,771 B2* | 2/2023 | Zhou | | H04W 72/046 |
| 11,638,255 B2* | 4/2023 | Zhou | | H04L 1/1896 375/267 |
| 2009/0102715 A1* | 4/2009 | Lou | | H04B 7/0695 342/372 |
| 2013/0039345 A1* | 2/2013 | Kim | | H04B 7/0408 370/332 |
| 2013/0215844 A1* | 8/2013 | Seol | | H04B 7/0695 370/329 |
| 2014/0056256 A1* | 2/2014 | Kim | | H04W 72/046 370/329 |
| 2016/0315737 A1* | 10/2016 | Seo | | H04W 72/1289 |
| 2017/0155432 A1* | 6/2017 | Kim | | H04W 72/046 |
| 2017/0302341 A1* | 10/2017 | Yu | | H04B 7/0695 |
| 2017/0359826 A1* | 12/2017 | Islam | | H04B 7/0617 |
| 2018/0091262 A1* | 3/2018 | Jung | | H04L 1/1825 |
| 2018/0109986 A1* | 4/2018 | Touboul | | H04W 36/18 |
| 2018/0309496 A1* | 10/2018 | Lee | | H04L 5/0048 |
| 2019/0052320 A1* | 2/2019 | Yu | | H04W 72/046 |
| 2019/0075573 A1* | 3/2019 | Kwon | | H04L 1/1812 |
| 2019/0200337 A1* | 6/2019 | Zhou | | H04W 72/0453 |
| 2019/0222289 A1* | 7/2019 | John Wilson | | H04L 5/0053 |
| 2019/0239207 A1* | 8/2019 | Tang | | H04W 24/04 |
| 2019/0253127 A1* | 8/2019 | Kang | | H04W 72/046 |
| 2020/0014444 A1* | 1/2020 | Mueck | | H04B 7/0408 |
| 2020/0021340 A1* | 1/2020 | Tang | | H04L 1/1887 |
| 2020/0052743 A1* | 2/2020 | Ryu | | H04L 5/0048 |
| 2020/0136680 A1* | 4/2020 | Kim | | H04B 7/0408 |
| 2020/0196327 A1* | 6/2020 | Zhang | | H04W 28/0268 |
| 2020/0267733 A1* | 8/2020 | Islam | | H04B 7/0617 |
| 2020/0275505 A1* | 8/2020 | Lei | | H04L 1/1864 |
| 2020/0350958 A1* | 11/2020 | Zhou | | H04B 7/0408 |
| 2020/0374960 A1* | 11/2020 | Deenoo | | H04W 72/1284 |
| 2020/0382197 A1* | 12/2020 | Kang | | H04B 7/0617 |
| 2020/0403738 A1* | 12/2020 | Zhou | | H04B 7/088 |
| 2020/0404639 A1* | 12/2020 | Zhou | | H04W 28/04 |
| 2021/0014898 A1* | 1/2021 | Lei | | H04L 5/0048 |
| 2021/0328641 A1* | 10/2021 | Xu | | H04B 7/0617 |
| 2021/0360435 A1* | 11/2021 | Dimou | | H04B 7/0695 |
| 2022/0015082 A1* | 1/2022 | Farag | | H04W 72/14 |
| 2022/0078855 A1* | 3/2022 | Kwak | | H04W 56/001 |
| 2022/0103237 A1* | 3/2022 | Lee | | H04B 7/0417 |
| 2022/0209902 A1* | 6/2022 | Gao | | H04L 5/0044 |
| 2022/0256543 A1* | 8/2022 | Tian | | H04L 5/0091 |
| 2022/0263602 A1* | 8/2022 | Horn | | H04W 72/082 |
| 2022/0287107 A1* | 9/2022 | Kim | | H04W 74/0866 |
| 2022/0294517 A1* | 9/2022 | Bar-Or Tillinger | | H04W 72/541 |
| 2022/0294569 A1* | 9/2022 | Matsuda | | H04L 1/1812 |
| 2022/0322480 A1* | 10/2022 | Deenoo | | H04W 76/19 |

FOREIGN PATENT DOCUMENTS

| | | | | |
|---|---|---|---|---|
| BR | 112019016131 A2 * | 4/2020 | ............ | H04B 1/74 |
| CA | 2844372 A1 * | 2/2013 | ........... | H04B 7/0408 |
| CA | 2844372 C * | 2/2018 | ........... | H04B 7/0408 |
| CA | 3052899 A1 * | 8/2018 | ............ | H04B 1/74 |
| CN | 107948987 A * | 4/2018 | ........... | H04B 7/0408 |
| CN | 110832785 A * | 2/2020 | ........... | H04B 7/0408 |
| CN | 110140298 B * | 9/2020 | ............ | H04B 1/74 |
| CN | 107210868 B * | 10/2020 | ............ | H04L 1/0001 |
| CN | 111918344 A * | 11/2020 | ............ | H04L 1/08 |
| CN | 107948987 B * | 8/2021 | ........... | H04B 7/0408 |
| CN | 113812200 A * | 12/2021 | ........... | H04L 1/1819 |
| CN | 113994604 A * | 1/2022 | ............ | H04B 7/063 |
| CN | 110832785 B * | 8/2022 | ........... | H04B 7/0408 |
| EP | 2815519 B1 * | 7/2018 | ........... | H04B 7/0456 |
| EP | 3468057 A1 * | 4/2019 | ........... | H04B 7/0456 |
| EP | 3506671 B1 * | 12/2020 | ........... | H04B 7/0408 |
| EP | 3806520 A1 * | 4/2021 | ........... | H04B 7/0408 |
| EP | 3468057 B1 * | 7/2021 | ........... | H04B 7/0456 |
| EP | 3579435 B1 * | 8/2021 | ............ | H04B 1/74 |
| JP | 2014526217 A * | 10/2014 | | |
| JP | 2017092999 A * | 5/2017 | ........... | H04B 7/0408 |
| JP | 6745741 B2 * | 8/2020 | ........... | H04B 7/0408 |
| JP | 2022537874 A * | 8/2022 | | |
| KR | 20130017932 A * | 2/2013 | | |
| KR | 20130095230 A * | 8/2013 | | |
| KR | 101839386 B1 * | 3/2018 | | |
| KR | 20190029535 A * | 3/2019 | | |
| KR | 101995357 B1 * | 7/2019 | | |
| KR | 20200028008 A * | 3/2020 | | |
| RU | 2733277 C1 * | 10/2020 | ............ | H04B 1/74 |
| WO | WO-2009052233 A1 * | 4/2009 | ........... | H04B 7/0413 |
| WO | WO-2013024942 A1 * | 2/2013 | ........... | H04B 7/0408 |
| WO | WO-2013122440 A1 * | 8/2013 | ........... | H04B 7/0456 |
| WO | WO-2018068724 A1 * | 4/2018 | ........... | H04B 7/0408 |
| WO | WO-2018145247 A1 * | 8/2018 | ............ | H04B 1/74 |
| WO | WO-2019013444 A1 * | 1/2019 | ........... | H04B 7/0408 |
| WO | WO-2019050380 A1 * | 3/2019 | ........... | H04B 17/327 |
| WO | WO-2020220348 A1 * | 11/2020 | ........... | H04L 1/1819 |
| WO | WO-2020224432 A1 * | 11/2020 | ............ | H04L 1/08 |
| WO | WO-2020256891 A1 * | 12/2020 | ........... | H04B 7/063 |
| WO | WO-2021126689 A1 * | 6/2021 | ........... | H04L 1/1887 |

OTHER PUBLICATIONS

International Search Report and Written Opinion—PCT/US2022/015128—ISA/EPO—dated Apr. 26, 2022.
Lenovo, et al., "Beam-Management Enhancements for NR from 52.6 GHz to 71GHz", 3GPP TSG RAN WG1 #104-e, 3GPP Draft, R1-2100060, 3rd Generation Partnership Project (3GPP), Mobile Competence Centre, 650, Route Des Lucioles, F-06921 Sophia-Antipolis Cedex, France, vol. RAN WG1, No. e-meeting, Jan. 25, 2021-Feb. 5, 2021, 9 Pages, Jan. 18, 2021 (Jan. 18, 2021), XP051970232, Retrieved from the Internet: URL: https://ftp.3gpp.org/tsg_ran/WG1_

(56) References Cited

OTHER PUBLICATIONS

RL1/TSGR1_104-e/Docs/R1-2100060.zip R1-2100060_Beam_management_Lenovo_MotoM_vfinal.docx [retrieved on Jan. 18, 2021] p. 2.

Qualcomm Incorporated: "CSI Enhancement for IOT and URLLC", 3GPP TSG RAN WG1 #104-e, 3GPP Draft, R1-2101460, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, 18 Pages, Jan. 19, 2021 (Jan. 19, 2021), XP051971625, Retrieved from the Internet: URL: https://ftp.3gpp.org/tsg_ran/WG1_RL1/TSGR1_104-e/Docs/R1-2101460.zip R1-2101460 CSI enhancement for IOT and URLLC.docx [retrieved on Jan. 19, 2021] p. 6.

* cited by examiner

HYBRID AUTOMATIC REPEAT REQUEST (HARQ) PROCEDURE USING MULTIPLE BEAMS IN A WIRELESS WIDE AREA NETWORK (WWAN)

TECHNICAL FIELD

Aspects of the present disclosure relate generally to wireless communication and to techniques for implementing a hybrid automatic repeat request (HARQ) procedure using multiple beams in a wireless wide area network (WWAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by an apparatus of a UE for implementing a HARQ protocol. The method may include obtaining a first HARQ transmission from a first BS of a WWAN via a first beam of a plurality of beams, and outputting a HARQ feedback for transmission to the first BS. The HARQ feedback may indicate to retransmit at least a portion of the first HARQ transmission. The method may include obtaining a HARQ retransmission associated with the first HARQ transmission via a second beam of the plurality of beams. The second beam may be different than the first beam.

Another innovative aspect of the subject matter described in this disclosure can be implemented in a method for wireless communication performed by an apparatus of a BS for implementing a HARQ protocol. The method may include outputting a first HARQ transmission for transmission to a UE of a WWAN via a first beam of a plurality of beams, and obtaining a first HARQ feedback from the UE. The first HARQ feedback may indicate to retransmit at least a portion of the first HARQ transmission. The method may include outputting a HARQ retransmission associated with the first HARQ transmission for transmission to the UE via a second beam of the plurality of beams. The second beam may be different than the first beam.

Another innovative aspect of the subject matter described in this disclosure can be implemented in an apparatus of a BS. The apparatus of the BS may include one or more processors and one or more interfaces. The one or more processors may be configured to implement a HARQ protocol. The one or more interfaces may be configured to output a first HARQ transmission for transmission to a UE of a WWAN via a first beam of a plurality of beams, obtain a first HARQ feedback from the UE, the first HARQ feedback indicating to retransmit at least a portion of the first HARQ transmission, and output a HARQ retransmission associated with the first HARQ transmission for transmission to the UE via a second beam of the plurality of beams. The second beam may be different than the first beam.

Another innovative aspect of the subject matter described in this disclosure can be implemented in an apparatus of a UE. The apparatus of the UE may include one or more processors and one or more interfaces. The one or more processors may be configured to implement a HARQ protocol. The one or more interfaces may be configured to obtain a first HARQ transmission from a first BS of a WWAN via a first beam of a plurality of beams, output a HARQ feedback for transmission to the first BS, the HARQ feedback indicating to retransmit at least a portion of the first HARQ transmission, and obtain a HARQ retransmission associated with the first HARQ transmission via a second beam of the plurality of beams. The second beam may be different than the first beam.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
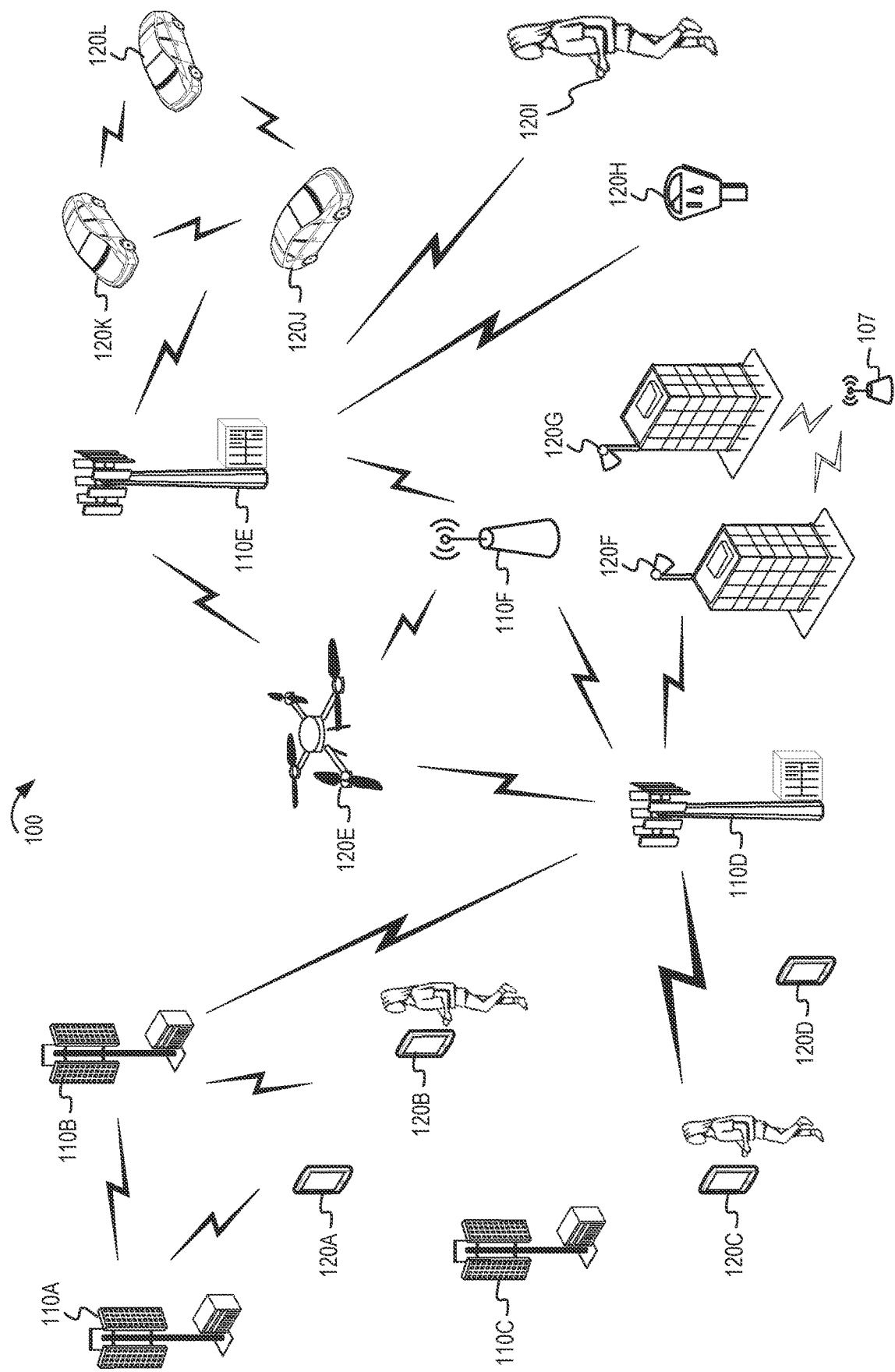
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A user equipment (UE) of the wireless communication network may use the 5G NR RAT or the LTE RAT depending on which wireless coverage is available to the UE and which wireless coverage provides the best quality service.

The 5G NR RAT may be designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) and sub-terahertz (sub-THz) bands. UEs and BSs that implement the 5G NR RAT may include multiple antennas and may support efficient beamforming with good spatial separation between the various beams. The UEs and BSs may utilize the various beams for communication purposes. The UEs and BSs may implement Hybrid Automatic Repeat Request (HARQ) protocols using beamforming to improve performance. When a BS transmits an initial HARQ transmission to a UE via a first beam, and subsequently transmits a HARQ retransmission associated with the initial HARQ transmission, the BS typically transmits the HARQ retransmission using the same beam (such as the first beam) that it used to transmit the initial HARQ transmission.

In some implementations, a BS may determine whether to use the same beam (such as the first beam) or a different beam (such as a second beam) to transmit the HARQ retransmission that it used to transmit the initial HARQ transmission. The BS and the UE may implement a HARQ protocol that uses multiple beams. The BS may use a different beam for the HARQ retransmission that it used for the initial HARQ transmission. The initial HARQ transmission also may be referred to as the original HARQ transmission or the first HARQ transmission.

In some implementations, a UE may establish a first data connection with a BS via a first beam. The UE may receive a first HARQ transmission associated with the first data connection from the BS via the first beam. The UE may transmit a HARQ feedback message (such as a NACK) to the BS indicating that the UE did not successfully receive and decode at least a portion of the first HARQ transmission. In some implementations, after receiving the NACK, the BS may determine whether to transmit a HARQ retransmission to the UE via the same beam (such as the first beam) used for the first HARQ transmission or via a different beam (such as a second beam) based on beam-specific conditions associated with the available beams, as further described herein. The beam-specific conditions may include one or more of a signal-to-interference-plus-noise ratio (SINR) associated with each of the beams, a reference signal receive power (RSRP) associated with each of the beams, channel conditions associated with each of the beams, diversity conditions associated with each of the beams, a rate of transmission associated with each transmitted HARQ transmission (such as the first HARQ transmission transmitted), one or more HARQ feedback messages obtained via one or more of the beams, and transmissions obtained by the BS from other UEs in the WWAN via one or more beams. In some implementations, the BS may determine whether the BS should transmit the HARQ retransmission to the UE or whether a different BS should transmit the HARQ retransmission to the UE based on the beam-specific conditions associated with the available beams. If the BS determines that a different BS should handle the HARQ retransmission, the BS may perform a handoff of the first data communication to the other BS so that the other BS may transmit the HARQ retransmission associated with the first HARQ transmission to the UE.

In some implementations, the BS may provide an indication to the UE indicating which beam the BS will use to transmit the HARQ retransmission to the UE. The indication may be referred to as a HARQ retransmission beam indication. The BS may provide the HARQ retransmission beam indication to the UE in advance of the UE receiving the HARQ retransmission. In some implementations, the BS may transmit the HARQ retransmission beam indication via a Downlink Control Information (DCI) associated with the first HARQ transmission. For example, the BS may transmit the DCI having the HARQ retransmission beam indication to the UE prior to or with the HARQ retransmissions. In some implementations, the BS may transmit the HARQ retransmission beam indication via a Radio Resource Control (RRC) message or via a Media Access Control (MAC) Control Element (CE) message transmitted to the UE during connection establishment and configuration operations.

Particular implementations of the subject matter described in this disclosure can be implemented to realize one or more of the following potential advantages. Using multiple beams for a HARQ protocol takes advantage of the multiple beams that are available for communication purposes from beamforming operations. When a BS uses a first beam to transmit a first HARQ transmission to a UE and then uses a different beam for the HARQ retransmission, the BS may optimize the use of the communication channels associated with the available beams. For example, if a different beam (such as a second beam) has less ideal beam-specific conditions (such as channel conditions) than the first beam, the BS may use the first beam having the more ideal beam-specific conditions to transmit new data and may use the second beam to transmit the HARQ retransmission. As another example, if a physical blocker affects the channel conditions of the first beam, the HARQ retransmission may be transmitted using a different beam (such as the second beam). Exploiting multiple beam capabilities for a HARQ protocol may reduce the HARQ procedure latency and may improve the HARQ performance and communication throughput. Providing NACKs on a symbol level in combination with performing the HARQ protocol using multiple beams may significantly improve the HARQ performance and may provide high diversity conditions for low latency communications.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

A BS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
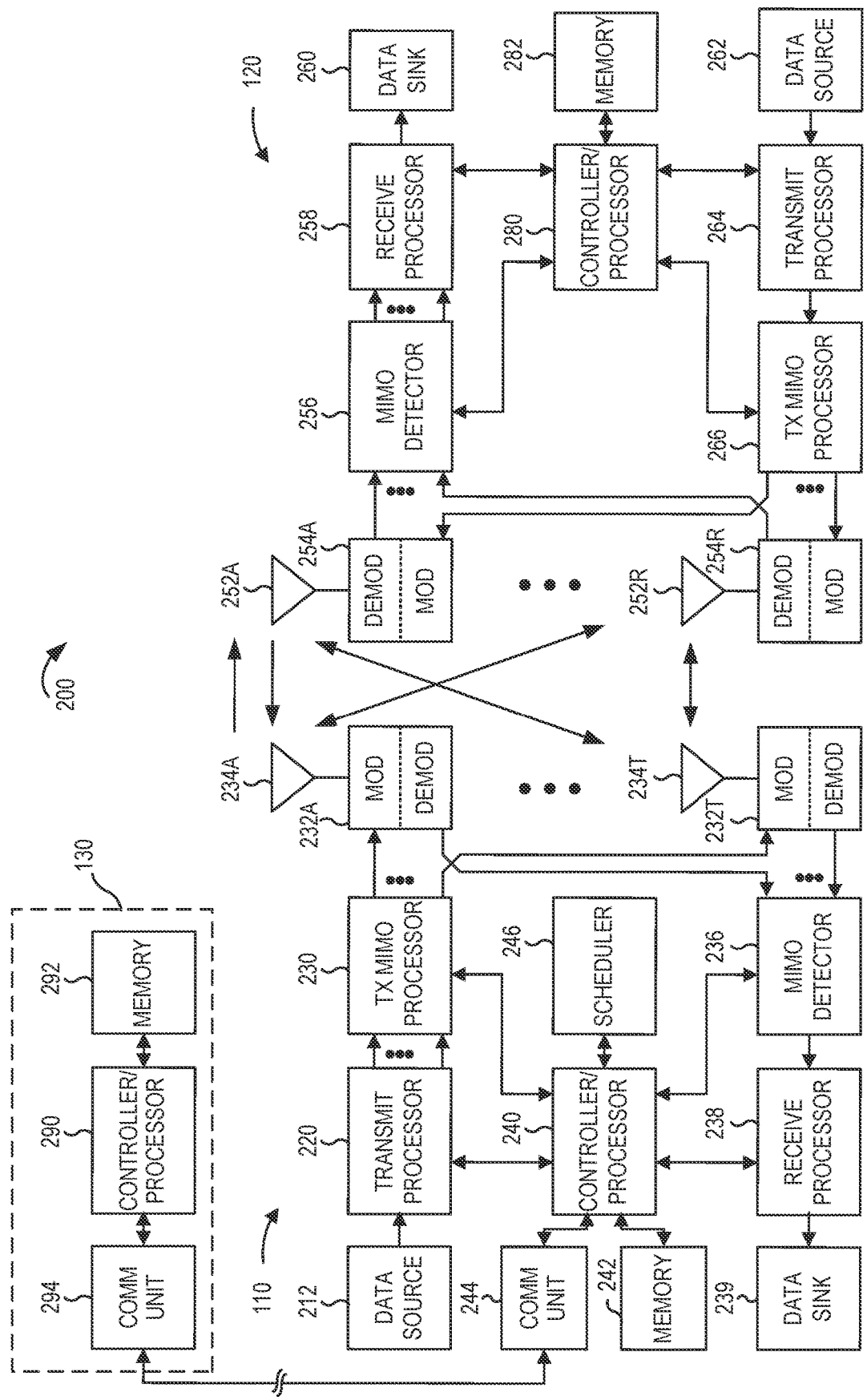
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with performing a HARQ protocol with multiple beams, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 700 of FIG. 7, the process depicted by flowchart 800 of FIG. 8 or other processes as described herein, such as the processes described in FIGS. 3-6. The memories 242 and 282 may store data and program codes for BS 110 and UE 120, respectively. A scheduler 246 may schedule UEs for data transmission on the downlink, the uplink, or a combination thereof.

Figure 5:
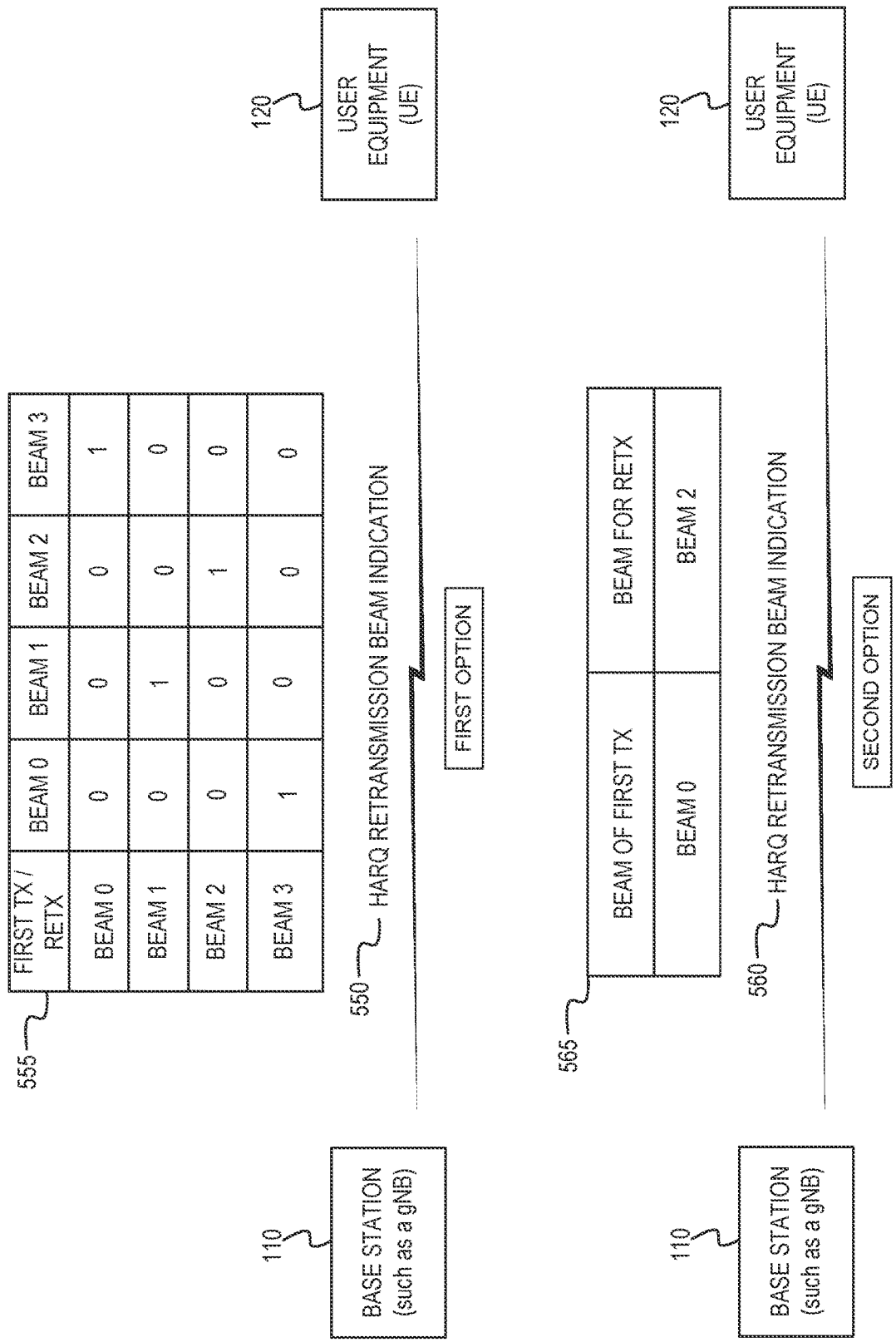
FIG. 5 shows a diagram showing example HARQ retransmission beam indications that may be transmitted by a BS to a UE in order to implement a HARQ protocol using multiple beams.
Figure 6:
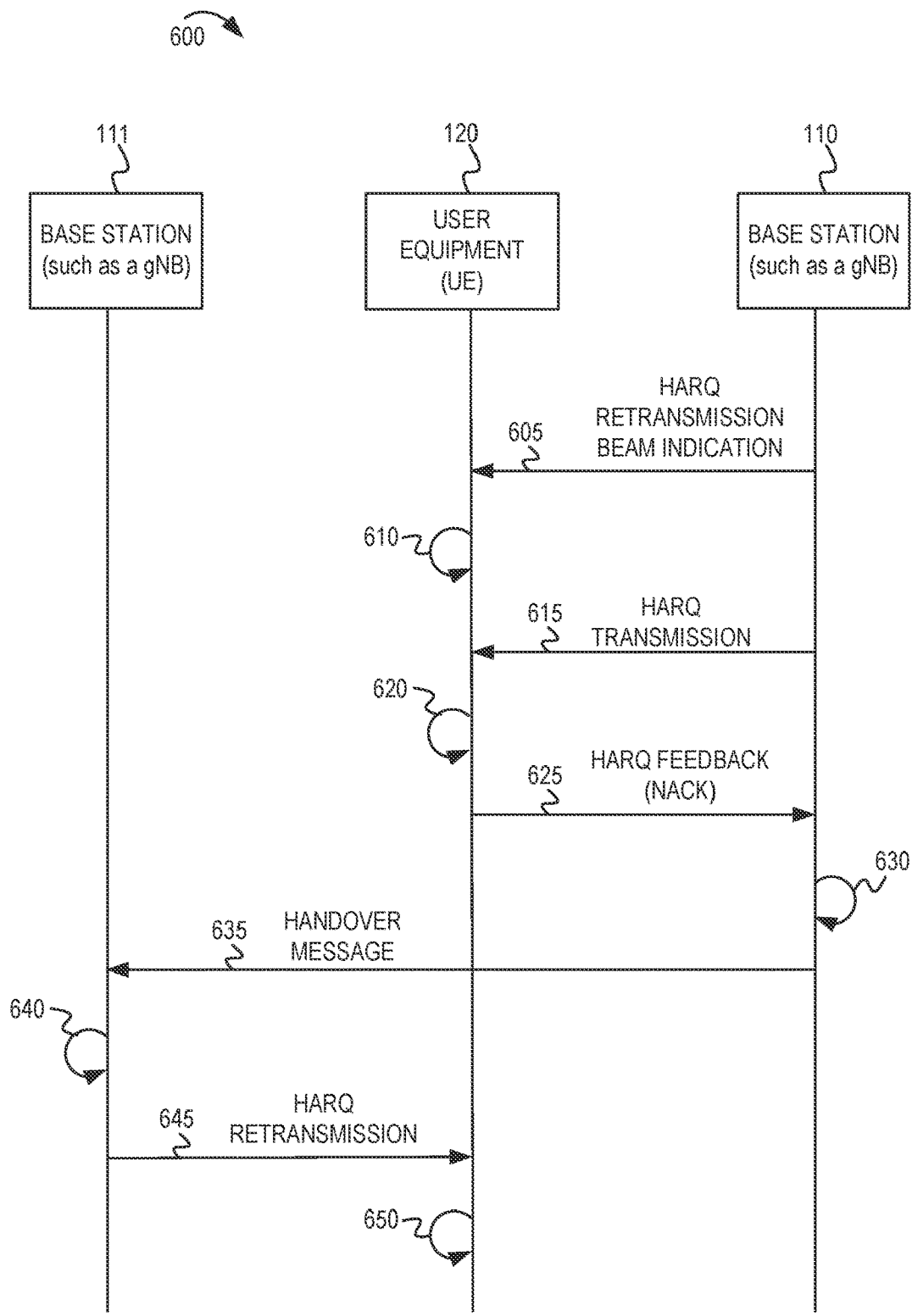
FIG. 6 shows an example message flow that shows a UE, a first BS, and a second BS that are configured to implement a HARQ protocol using multiple beams from different BSs.
Figure 7:
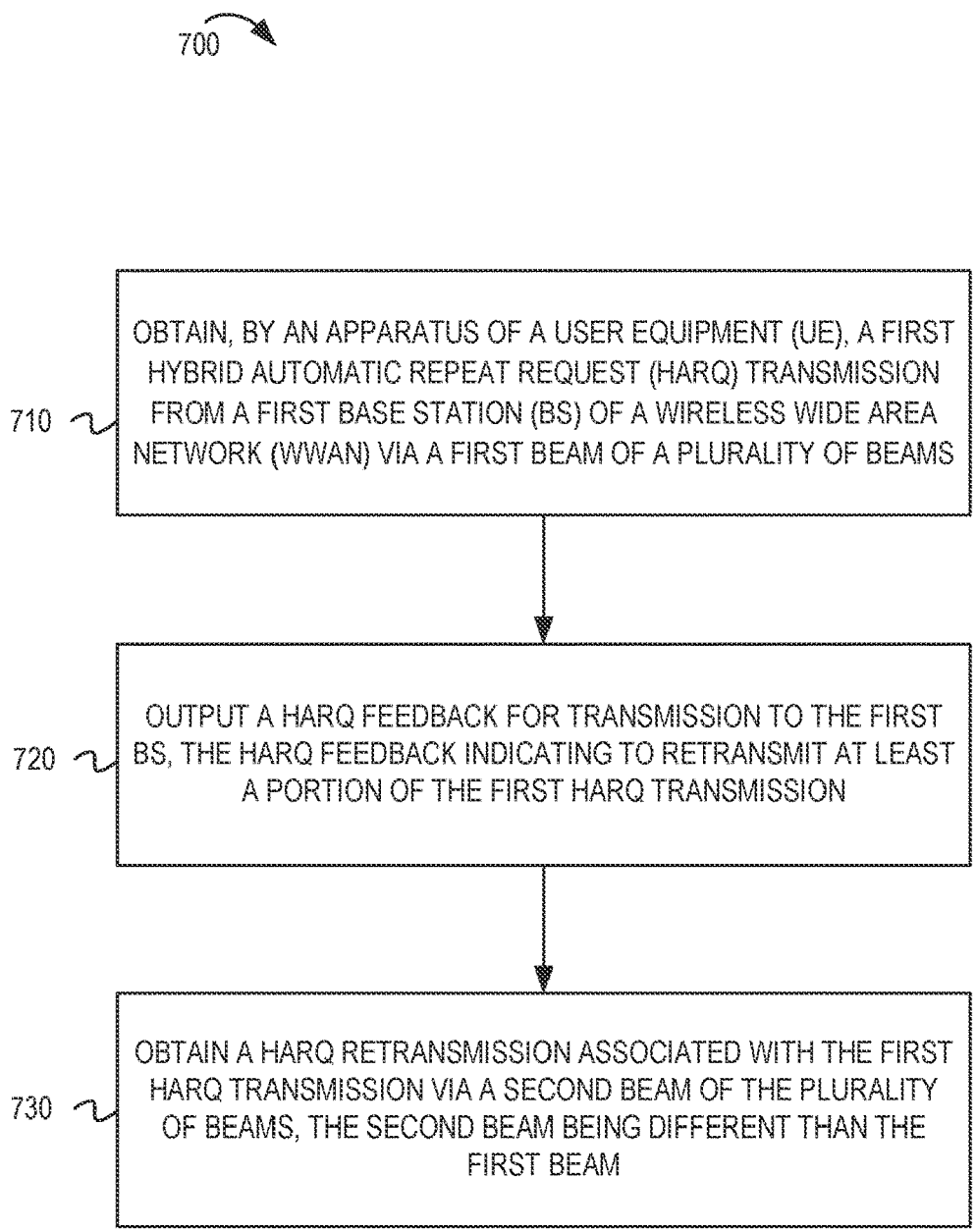
FIG. 7 depicts a flowchart with example operations performed by an apparatus of a UE for implementing a HARQ protocol using multiple beams.
Figure 8:
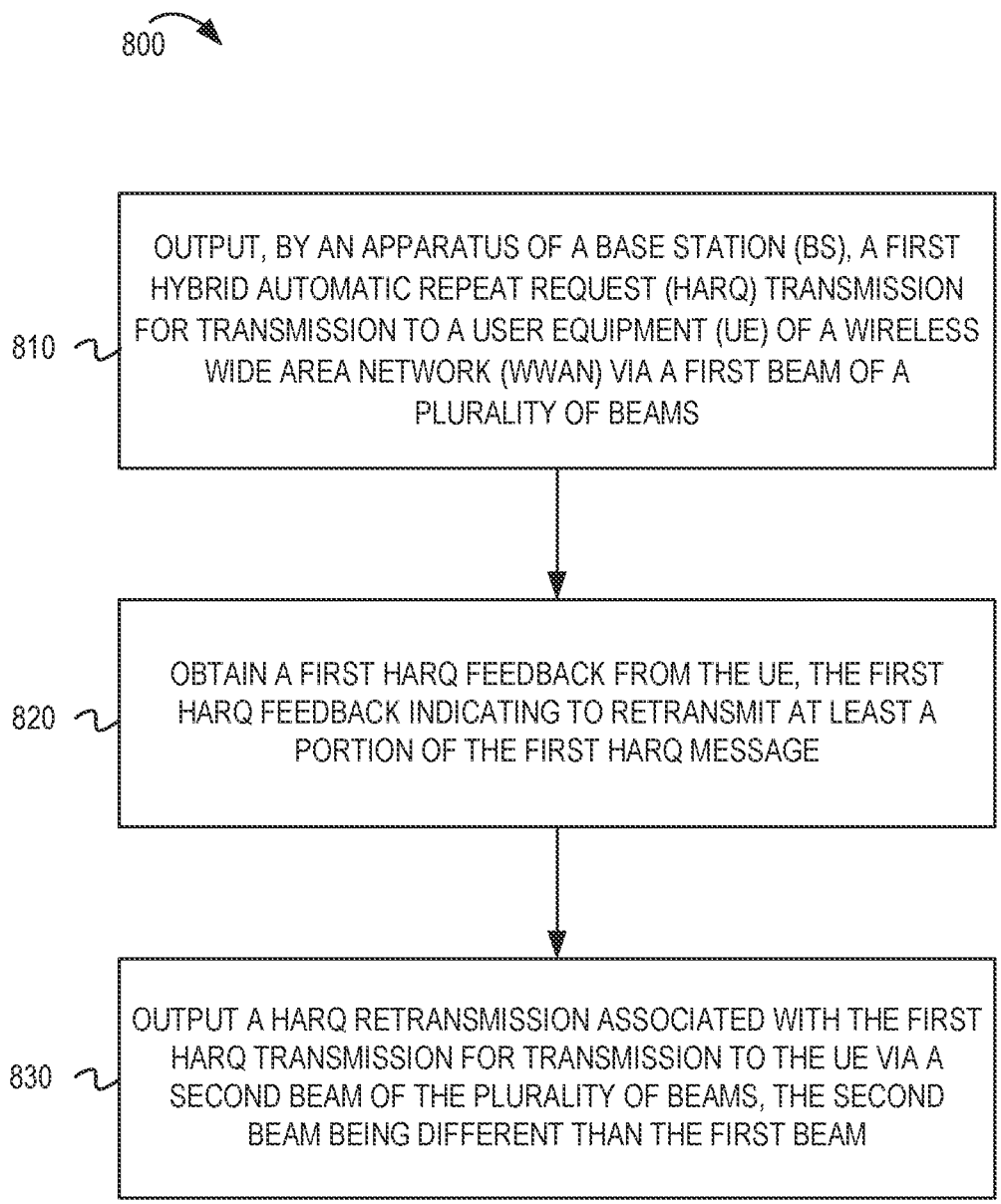
FIG. 8 depicts a flowchart with example operations performed by an apparatus of a BS for implementing a HARQ protocol using multiple beams.

The stored program codes, when executed by the controller/processor 280 or other processors and modules at UE 120, may cause the UE 120 to perform operations described with respect to the process depicted by flowchart 700 of FIG. 7, the process depicted by flowchart 800 of FIG. 8 or other processes as described herein, such as the processes described in FIGS. 3-6. The stored program codes, when executed by the controller/processor 240 or other processors and modules at BS 110, may cause the BS 110 to perform operations described with respect to the process depicted by flowchart 700 of FIG. 7, the process depicted by flowchart 800 of FIG. 8 or other processes as described herein, such as the processes described in FIGS. 3-6. A scheduler 246 may schedule UEs for data transmission on the downlink, the uplink, or a combination thereof.

In some aspects, UE 120 may include means for performing the process depicted by flowchart 700 of FIG. 7, the process depicted by flowchart 800 of FIG. 8 or other processes as described herein, such as the processes described in FIGS. 3-6. In some aspects, such means may include one or more components of UE 120 described in connection with FIG. 2.

In some aspects, BS 110 may include means for performing the process depicted by flowchart 700 of FIG. 7, the process depicted by flowchart 800 of FIG. 8 or other processes as described herein, such as the processes described in FIGS. 3-6. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
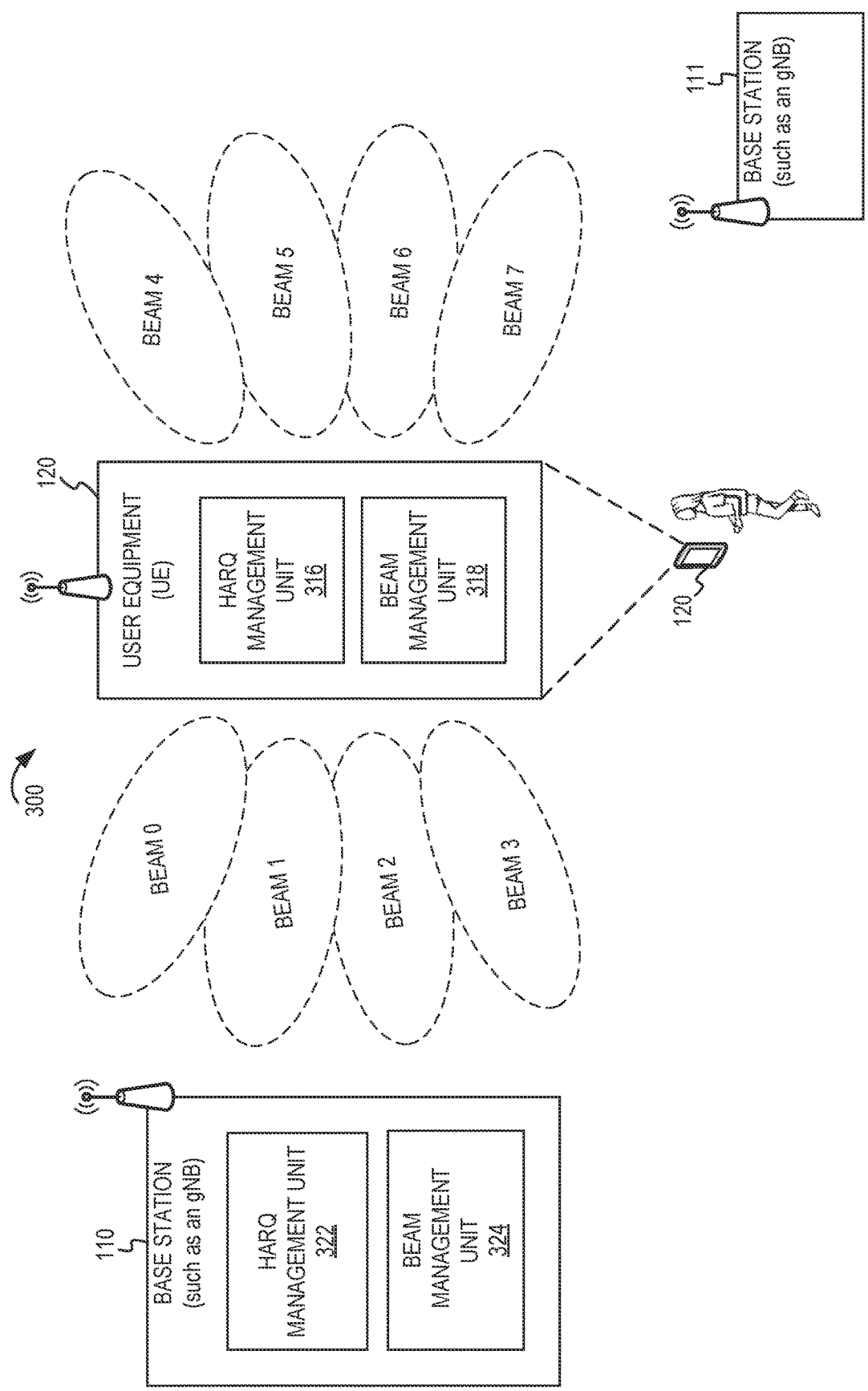
FIG. 3 shows a system diagram of an example wireless communication network including a UE and a BS that are configured to implement a Hybrid Automatic Repeat Request (HARQ) protocol using multiple beams.

FIG. 3 shows a system diagram of an example wireless communication network including a UE and a BS that are configured to implement a HARQ protocol using multiple beams. The wireless communication network 300 shown in FIG. 3 is based on the example wireless communication network 100 described in FIG. 1. The wireless communication network 300 also may be referred to as a wide area network (WAN) or a wireless wide area network (WWAN). The wireless communication system 300 may include a UE 120, a BS 110, and a BS 111. The UE 120 may be an example implementation of the UEs shown in FIGS. 1 and 2. The BS 110 and the BS 111 may each be an example implementation of the BSs shown in FIGS. 1 and 2. As shown in FIG. 3, in some implementations, the BS 110 and the BS 111 may each be a gNB that may implement a 5G NR RAT. The 5G NR RAT may be designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) and sub-terahertz (sub-THz) bands. Although not shown for simplicity, the wireless communication system 300 may include one or more additional BSs and one or more additional UEs.

In some implementations, the BS 110 may include a HARQ management unit 322 and a beam management unit 324. The HARQ management unit 322 may implement a HARQ protocol using multiple beams. For example, the HARQ management unit 322 may determine whether to transmit a HARQ retransmission via the same beam that was used for an initial HARQ transmission or transmit the HARQ retransmission via a different beam, as further described herein. The beam management unit 324 may manage the beamforming operations and work in conjunction with the HARQ management unit 322 to manage the various available beams to perform the HARQ protocol. The beam management unit 324 also may determine beam-specific conditions associated with the available beams, as further described herein. Although not shown in FIG. 3, the BS 111 also may include a HARQ management unit and a beam management unit.

In some implementations, the UE 120 may include a HARQ management unit 316 and a beam management unit 318. The HARQ management unit 316 may implement a HARQ protocol using multiple beams, as further described herein. The beam management unit 318 may manage the beamforming operations and work in conjunction with the HARQ management unit 316 to manage the various available beams to perform the HARQ protocol. The beam management unit 316 also may measure beam-specific conditions associated with the available beams.

In some implementations, the UE 120 may implement beamforming to transmit and receive messages (such as HARQ transmissions) and other information via one or more beams. The UE 102 may utilize various beams for communication purposes. As shown in FIG. 3, in some implementations, the UE 120 may have eight beams available for wireless communications via the various frequency bands available in 5G NR. For example, the UE 120 may utilize eight beams for 5G NR wireless communications via mmW and sub-THz bands. For example, the UE 120 may use beam 0 (also referred to as a first beam), beam 1 (also referred to as a second beam), beam 2 (also referred to as a third beam), beam 3 (also referred to as a fourth beam), beam 4 (also referred to as a fifth beam), beam 5 (also referred to as a sixth beam), beam 6 (also referred to as a seventh beam), and beam 7 (also referred to as an eighth beam). The UE 120 may utilize any number of beams for wireless communications. As another example, the UE 120 may utilize four beams for 5G NR wireless communications.

The UE 120 may support multiple data connections via multiple beams. For example, the UE 120 may establish a first data connection via beam 0 and a second data connection via beam 3. The UE 120 may receive a first HARQ transmission associated with the first data connection from the BS 110 via beam 0 and may receive a second HARQ transmission associated with the second data connection from the BS 110 via beam 3. The UE 120 may transmit a HARQ feedback message (such as an ACK or NACK) to the BS 110 for each data connection indicating whether the UE 120 successfully received and decoded the corresponding HARQ transmission. For example, if the UE 120 did not successfully receive and decode at least a portion of the first HARQ transmission, the UE 120 may transmit a NACK to the BS 110. In some implementations, for each data connection, the BS 110 may determine whether to transmit the HARQ retransmission to the UE 120 via the same beam used for the initial HARQ transmission or via a different beam based on beam-specific conditions, as further described herein. For example, if the BS 110 receive a NACK associated with the first data transmission from the UE 120 via the beam 0 (the same beam used for the first HARQ transmission), the BS 110 may determine whether to transmit the HARQ retransmission via the beam 0 or via a different beam (such as beam 2). In some implementations, the BS 110 may determine whether the BS 110 should transmit the HARQ retransmission to the UE 120 or whether a different BS (such as BS 111) should transmit the HARQ retransmission to the UE 120. If the BS 110 determines that a different BS should handle the HARQ retransmission, the BS 110 may perform a handover of the first data communication to the BS 111 and the BS 111 may transmit the HARQ retransmission to the UE 120 via a different beam (such as beam 7). As another example, if the BS 110 receive a NACK associated with the second data transmission from the UE 120 via the beam 3 (the same beam used for the second HARQ transmission), the BS 110 may determine whether to transmit the HARQ retransmission via beam 3 or via a different beam (such as beam 1). The BS 110 also may determine whether to handover the second data communication to a different BS (such as the BS 111) to have the different BS transmit the HARQ retransmission associated with the second data connection.

In some implementations, the BS 110 may determine whether to use the same beam or a different beam for the HARQ retransmission based on one or more beam-specific conditions (which also may be referred as beam-specific parameters). The beam-specific conditions may include one or more of a signal-to-interference-plus-noise ratio (SINR) associated with each of the beams, a reference signal receive power (RSRP) associated with each of the beams, channel conditions associated with each of the beams, diversity conditions associated with each of the beams, a rate of transmission associated with each transmitted HARQ transmission (such as the first HARQ transmission transmitted via the beam 0), one or more HARQ feedback messages obtained via one or more of the beams, and transmissions obtained by the BS 110 from other UEs in the WWAN via one or more beams.

In some implementations, the BS 110 may determine whether to use the same beam or a different beam for the HARQ retransmission based on at least one of the SINR associated with each of the beams and the RSRP associated with each of the beams. For example, if the first HARQ transmission is transmitted in first beam (such as beam 0), the BS 110 may determine and analyze the SINR associated with all the available beams and may determine that the SINR associated with a second beam (such as beam 2) is greater than the SINR associated with the first beam (such as beam 0). The BS 110 may determine to transmit the HARQ retransmission to the UE 120 via a different beam (such as the second beam or beam 2) if the SINR associated with the second beam is greater than the SINR associated with the first beam. As another example, the BS 110 may determine and analyze the RSRP associated with all the available beams and may determine to transmit the HARQ retransmission to the UE 120 via a different beam (such as the second beam or beam 2) if the RSRP associated with the second beam is greater than the RSRP associated with the first beam. Selecting a different beam with a higher SINR or RSRP than the first beam may improve the chances that the HARQ retransmissions passes cyclic redundancy check (CRC) operations performed at the UE 120. If the BS 110 determines that the first beam has an SINR or RSRP that is greater than the other beams, the BS 110 may determine to transmit the HARQ retransmission via the first beam (the same beam that it transmitted the first HARQ transmission). In some implementations, the BS 110 may determine whether the first beam (such as beam 0) used to transmit the first HARQ transmission has an SINR or RSRP that is greater than or equal to an SINR threshold or an RSRP threshold, respectively, to determine whether to use the same beam or a different beam for the HARQ retransmission. For example, if the BS 110 determines that the first beam has an SINR or RSRP that is greater than or equal to the SINR threshold or the RSRP threshold, respectively, the BS 110 may use the same beam for the HARQ retransmission. If the BS 110 determines that the first beam has an SINR or RSRP that is less than the SINR threshold or the RSRP threshold, respectively, the BS 110 may select a different beam (such as the beam 2) that has an SINR or RSRP that is greater than or equal to the SINR threshold or the RSRP threshold, respectively, for the HARQ retransmission.

In some implementations, the BS 110 may select a different beam for the HARQ retransmission that has an RSRP or an SINR that is less than the RSRP or the SINR of the first beam. For HARQ retransmissions, there is typically a retransmission gain or a coding gain that may allow the BS 110 to use a different beam with a lower RSRP or SINR than the first beam. For example, the retransmission gain or the coding gain may be at least 3 dB. The retransmission gain or the coding gain may improve the chances that the HARQ retransmissions passes the CRC operations performed at the UE 120 when the BS 110 selects a different beam that has a lower RSRP or SINR than the first beam. Even if the HARQ retransmission receives a low retransmission or coding gain (such as approximately 0.5 dB or 1 dB), the BS 110 may still use a different beam for the HARQ retransmission, in order to use the first beam having a greater RSRP or SINR for a different transmission (such as a transmission of new data). For example, the BS 110 may determine to optimize the transmission of new data in a subsequent HARQ transmission by using the first beam having the higher RSRP or SINR and using a different beam for the HARQ retransmission having a lower RSRP or SINR. For example, the BS 110 may determine that a third HARQ transmission associated with a third data connection with a different UE may be optimized by using a beam having a higher SINR. The BS 110 may determine to transmit the HARQ retransmission associated with the first HARQ transmission in a different beam (such as beam 2) and may transmit the third HARQ transmission via the first beam (such as beam 0). If the BS 110 does not have new data scheduled for transmission, the BS 110 may use the first beam for the HARQ retransmission. In some implementations, the BS 110 also may consider the rate of transmission of the first HARQ transmission when considering the retransmission gain or the coding gain to determine whether to use the same beam or a different beam for the HARQ retransmission. For example, the BS 110 may consider the RSRP or the SINR, the rate of transmission of the first HARQ transmission, and the transmission gain or the coding gain (such as a gain of between approximately 3 dB or more) to determine whether to use the same beam or a different beam for the HARQ retransmission.

In some implementations, the BS 110 may determine whether to use the same beam or a different beam for the HARQ retransmission based on channel conditions associated with one or more of the beams. The BS 110 may receive a Channel State Information (CSI) report or a Quasi Co-Location (QCL) report from the UE 120 indicating channel conditions. The CSI report may indicate the RSRP or the SINR associated with each of the beams, which may be determined from the CSI-RSs provided to the UE 120 via each of the beams or from the SSBs provided to the UE 120 via each of the beams. The CSI report also may indicate other channel information such as the modulation type and code rate. The QCL report also may indicate channel information, such as doppler shift information, doppler spread information, delay information, and spatial receive parameters. In some implementations, the BS 110 may perform channel estimation operations on the transmission from the UE 120 that includes the CSI report or the QCL report. The channel estimation operations may indicate channel conditions on the channel used by the UE 120 for the uplink transmission. The BS 110 may assume reciprocity of the uplink and downlink channels and thus may consider the channel conditions determined from the channel estimation and the other channel conditions determined from at least one of the CSI report and the QCL report to determine whether to transmit the HARQ retransmission via the same beam or a different beam. In some implementations, the CSI report received from the UE 120 may indicate a desired beam for the HARQ retransmission. The BS 110 may consider the desired beam indicated by the UE 120, the channel conditions determined from the channel estimation and the other channel conditions to determine whether to transmit the HARQ retransmission via the same beam or a different beam. In some implementations, channel conditions also may include an indication of blockers in a beam. An object, obstruction or other barrier that blocks a transmission or introduces errors in a transmission may be considered a blocker. For example, if the user of the UE 120 passes by a building, a vehicle, or other type of barrier that may be between the UE 120 and the BS 110 may block the transmission or introduce errors into the transmission. The BS 110 may detect potential blockers in a beam by various methods. For example, the BS 110 may receive multiple NACKs associated with different data connections via the same beam. The BS 110 may determine that the beam potentially has a blocker based on receiving the multiple NACKs. The BS 110 may temporarily avoid sending any transmissions including the HARQ retransmission via the beam that potentially has a blocker.

In some implementations, the BS 110 may determine whether to use the same beam or a different beam for the HARQ retransmission based on diversity conditions associated with one or more of the beams. For example, the BS 110 may determine whether the UE 120 is stationary, moving at a low speed, or moving at a high speed to determine whether the diversity conditions may be improved for the HARQ transmissions. For example, the BS 110 may determine whether the UE 120 is stationary, moving at a low speed, or moving at a high speed based on one or more channel parameters, such as the doppler spread information obtained from the UE 120 via the QCL report. In some implementations, if the UE 120 is stationary or moving at a low speed (having a low doppler spread), the BS 110 may determine that transmitting the HARQ retransmission in a different beam may improve the diversity conditions for the HARQ transmissions, since the different beams uses different channels having different channel conditions. If the UE 120 is moving at a high speed, the BS 110 may determine that the HARQ transmissions may have sufficient diversity from the high-speed scenario (having a high doppler spread), since the high-speed movement of the UE 120 may result in the use different channels having different channel conditions for the HARQ transmissions.

In some implementations, the BS 110 may determine whether to use the same beam or a different beam for the HARQ retransmission based on one or more additional HARQ feedback messages received via one or more of the beams. For example, the BS 110 may consider one or more additional NACKs received via one or more of the beams. If the BS 110 receives multiple NACKs, then the BS 110 may have to determine whether to transmit the HARQ retransmission via the same beam or a different beam for multiple data connections. For example, the BS 110 may receive a first NACK from the UE 120 via the first beam (such as beam 0) for the first data connection and receive a second NACK from a different UE via the fourth beam (such as beam 3) for the second data connection. The BS 110 may consider one or more of the beam-specific conditions described herein for each of the first and second data connections to determine which beam to transmit a first HARQ retransmission associated with the first data connection and which beam to transmit a second HARQ retransmission associated with the second data connection.

In some implementations, if the BS 110 determines to transmit the HARQ retransmission associated with the first HARQ transmission via the same beam (such as the first beam or beam 0) based on beam-specific conditions, then the BS 110 transmits the HARQ retransmission via the first beam to the UE 120. If the BS 110 determines to transmit the HARQ retransmission associated with the first HARQ transmission via a different beam (such as a third beam or beam 2) based on beam-specific conditions, then the BS 110 transmits the HARQ retransmission via the third beam to the UE 120. When the BS 110 uses a different beam to transmit the HARQ retransmission, the BS 110 may use the first beam to transmit new data associated with a different data connection.

In some implementations, when the BS 110 determines to transmit the HARQ retransmission via a different beam, the BS 110 may determine to have a beam of a different BS (such as BS 111) transmit the HARQ retransmission to the UE 120 based on the beam-specific conditions described herein. For example, the BS 110 may determine to use the available beams for new data associated with different data connections and may request the BS 111 to transmit the HARQ retransmission associated with the first HARQ transmission. As another example, the BS 110 may determine that the RSRP or SINR associated with the available beams of the BS 110 may be too low or that the channel conditions associated with the available beams of the BS 110 may be degraded, and thus the BS 110 may request the BS 111 to transmit the HARQ retransmission. As another example, the BS 110 may determine based on the doppler spread information that the UE 120 is moving at a high speed, and thus may request the BS 111 to transmit the HARQ retransmission. In some implementations, the BS 110 may request the BS 111 to transmit the HARQ retransmission by performing a handoff from the BS 110 to the BS 111. Similarly, as described herein for the BS 110, after the handoff from the BS 110 to the BS 111, the BS 111 may determine which beam to transmit the HARQ retransmission based on the beam-specific conditions associated with the available beams of the BS 111.

In some implementations, the BS 110 may provide an indication to the UE 120 indicating which beam the BS 110 will use to transmit the HARQ retransmission to the UE 120. The indication may be referred to as a HARQ retransmission beam indication. The BS 110 may provide the HARQ retransmission beam indication to the UE 120 in advance of the UE 120 receiving the HARQ retransmission. In some implementations, the BS 110 may transmit the HARQ retransmission beam indication via a Downlink Control Information (DCI) associated with the first HARQ transmission. The DCI may be included in a PDCCH that is transmitted from the BS 110 to the UE 120. The DCI may provide information (such as resource identification information, modulation type, etc.) that allows the UE 120 to identify and decode data in a data transmission, such as a HARQ transmission. In some implementations, the HARQ retransmission beam indication may be included in the DCI in order indicate which beam is being used to transmit the HARQ retransmission. For example, one or more additional bits may be added to the DCI to include the HARQ retransmission beam indication in the DCI. As another example, one or more reserved bits of the DCI may be used to include the HARQ retransmission beam indication in the DCI.

In some implementations, the BS 110 may transmit the HARQ retransmission beam indication via an RRC message transmitted to the UE 120 during RRC connection configuration operations. In some implementations, the HARQ retransmission beam indication may be one or more bits of the RRC message that indicate which beam is being used to transmit the HARQ retransmission. For example, one or more additional bits may be added to the RRC message in order to include the HARQ retransmission beam indication. As another example, one or more reserved bits of the RRC message may be used to include the HARQ retransmission beam indication in the RRC message.

In some implementations, the BS 110 may transmit the HARQ retransmission beam indication via a Media Access Control (MAC) Control Element (CE) message transmitted to the UE 120 during MAC configuration operations. In some implementations, the HARQ retransmission beam indication may be one or more bits of the MAC-CE message that indicate which beam is being used to transmit the HARQ retransmission. For example, one or more additional bits may be added to the MAC-CE message in order to include the HARQ retransmission beam indication. As another example, one or more reserved bits of the MAC-CE message may be used to include the HARQ retransmission beam indication in the MAC-CE message.

In some implementations, the HARQ retransmission beam indication may indicate the beam number or other beam identifying information of the beam that is being used to transmit the HARQ retransmission. For example, the beam number may be referred to as a beam indicator (BI) or beam number indicator (BNI). As another example, the beam identifying information may be an SSB number that is associated with a beam number and thus the SSB number may indicate the associated beam number. In some implementations, the HARQ retransmission beam indication may indicate the beam number or other beam identifying information of the beam that transmitted the original HARQ transmission and the beam that is being used to transmit the HARQ retransmission (whether it is the same beam or a different beam). For example, if the first beam (beam 0) was used to transmit the HARQ transmission, and the BS 110 determines to use the same beam for the HARQ retransmission, the HARQ retransmission beam indication may indicate the first beam (beam 0) transmitted the original HARQ transmission and the first beam (beam 0) is being used to transmit the HARQ retransmission. As another example, if the first beam (beam 0) was used to transmit the HARQ transmission, and the BS 110 determines to use a different beam for the HARQ retransmission, the HARQ retransmission beam indication may indicate the first beam (beam 0) transmitted the original HARQ transmission and a third beam (beam 2) is being used to transmit the HARQ retransmission. In some implementations, the HARQ retransmission beam indication may include a beam connection index or beam connection map that indicates an index or a map of some or all available beams indicating which beams are used to transmit the HARQ retransmissions based on the beams that were used to transmit the original HARQ transmissions, as further described in FIGS. 4 and 5.

In some implementations, when the BS 110 provides the HARQ retransmission beam indication via the RRC message or a MAC-CE message, the BS 110 may retransmit the HARQ retransmission beam indication periodically or aperiodically with the RRC message or the MAC-CE message. For example, when the RRC message or the MAC-CE message is transmitted periodically, the HARQ retransmission beam indication may be included in the periodic RRC message or the periodic MAC-CE message. As another example, when the connection configurations change and the RRC message or the MAC-CE message is sent outside of a periodic schedule, the HARQ retransmission beam indication may be sent aperiodically with the RRC message or the MAC-CE message. The BS 110 may transmit the same HARQ retransmission beam indication periodically or aperiodically. If the beam associations change for HARQ retransmissions, the BS 110 may update the HARQ retransmission beam indication and may transmit the updated HARQ retransmission beam indication the next time the RRC message or the MAC-CE message is sent (whether periodically or aperiodically). In some implementations, when the BS 110 transmits the HARQ retransmission beam indication via the DCI, the BS 110 may transmit the DCI having the HARQ retransmission beam indication associated with each HARQ transmission prior to or with each of the HARQ retransmissions, as further described in FIG. 4.

As described herein, the UE 120 may receive the HARQ retransmission beam indication from the BS 110 in advance of the UE 120 receiving the HARQ retransmission. The UE 120 may concurrently receive various HARQ communications associated with various HARQ processes via different beams, and thus the UE 120 may use the beam number (or other beam identification information) included in the HARQ retransmission beam indication to determine which beam will include the pertinent HARQ retransmission. When the BS 110 transmits a first HARQ transmission to the UE 120, the BS 110 may include the first HARQ transmission in a Transport Block (TB). When the BS 110 transmits the HARQ retransmission associated with the first HARQ transmission, the HARQ retransmission may include a TB indicator that indicates which TB the BS 110 used to transmit the first HARQ transmission. In some implementations, the UE 120 may use the HARQ retransmission beam indication and the TB indicator to identify and obtain the HARQ retransmission from the pertinent beam and to identify which TB associated with the first HARQ transmission the UE 120 should use to perform the HARQ Log-Likelihood Ratio (LLR) combining operations to recover and decode the data.

In some implementations, the HARQ procedure described herein that uses multiple beams may be implemented in both uplink and downlink HARQ. In some implementations, the HARQ procedure that uses multiple beams may be implemented in a time-division multiplexing (TDM) mode, in a frequency division multiplexing (FDM) mode, or in a full duplex mode.

Figure 4:
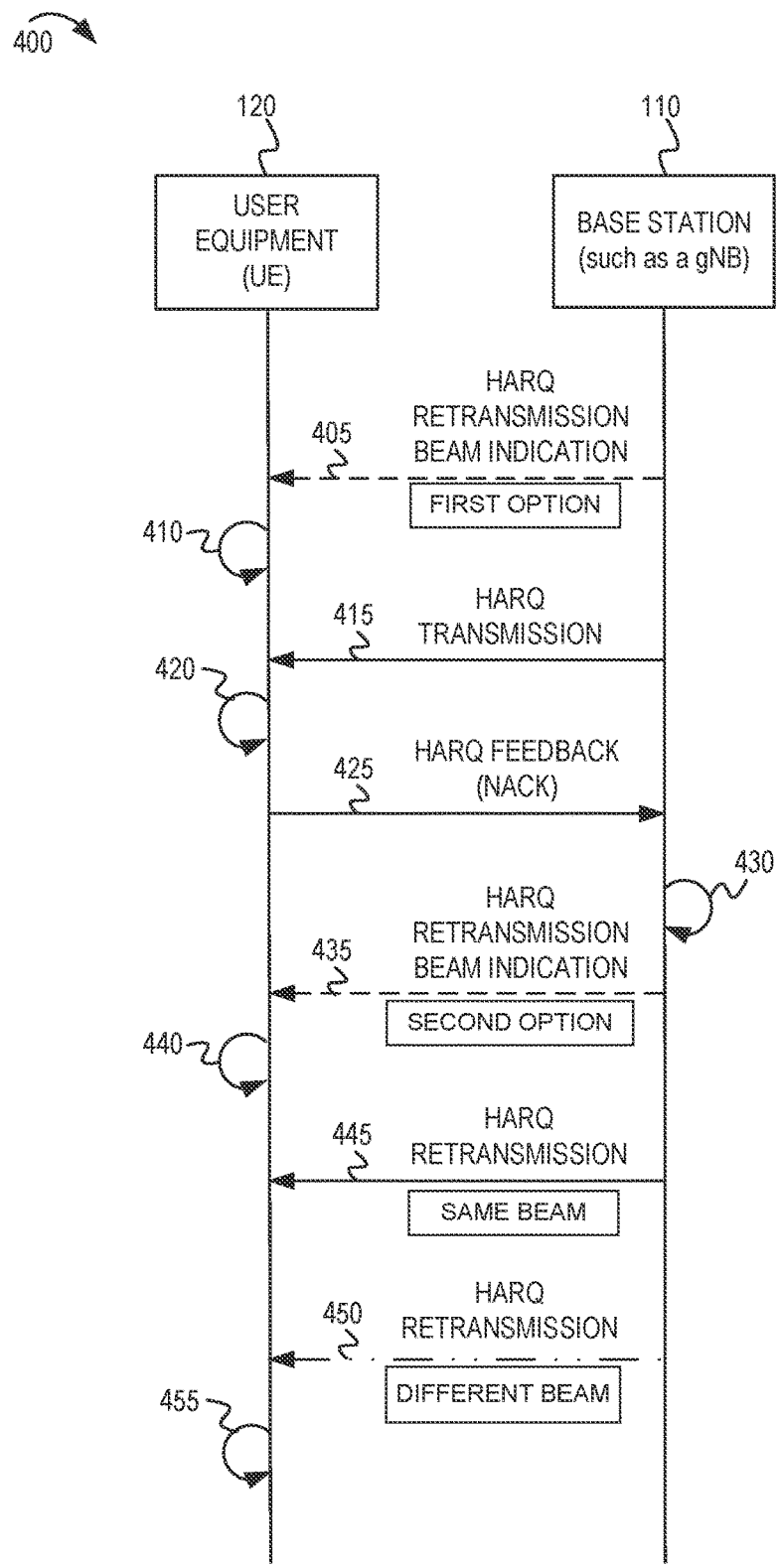
FIG. 4 shows an example message flow that shows a UE and a BS that are configured to implement a HARQ protocol using multiple beams.

FIG. 4 shows an example message flow that shows a UE and a BS that are configured to implement a HARQ protocol using multiple beams. The message flow diagram 400 includes the UE 120 and the BS 110 that are described in FIG. 3.

At 405, the BS 110 may provide a HARQ retransmission beam indication to the UE 120 indicating which beam the BS 110 will use to transmit a HARQ retransmission to the UE 120. In some implementations, the BS 110 may provide the HARQ retransmission beam indication during connection establishment and configuration operations, according to a first option. For example, the BS 110 may transmit the HARQ retransmission beam indication to the UE 120 via an RRC message. As another example, the BS 110 may transmit the HARQ retransmission beam indication to the UE 120 via a MAC-CE message. In some implementations, when the BS 110 provides the HARQ retransmission beam indication during connection establishment and configuration operations, it may be referred to as a predefined HARQ retransmission beam indication because the beam associations indicated by the predefined HARQ retransmission indication may be used by all of the UEs associated with the BS 110 (including the UE 120) for all of the HARQ communications performed via the available beams until the HARQ retransmission beam indication is updated. In some implementations, when the BS 110 provides the HARQ retransmission beam indication during connection establishment and configuration operations, the BS 110 also may retransmit the HARQ retransmission beam indication periodically or aperiodically, and maybe update the HARQ retransmission beam indication periodically or aperiodically. In some implementations, the BS 110 may provide the HARQ retransmission beam indication prior to or with the corresponding HARQ retransmission, according to a second option (such as the second option at 435 in the message flow).

At 410, the UE 120 may obtain or receive, process, and store the HARQ retransmission beam indication, according to the first option described at 405. If the HARQ retransmission beam indication has changed, the UE 120 may process and store the updated HARQ retransmission beam indication. In some implementations, the UE 120 may receive the HARQ retransmission beam indication via an RRC message or a MAC-CE message periodically or aperiodically.

At 415, the BS 110 may transmit the HARQ transmission to the UE 120. For example, the BS 110 may output the HARQ transmission for transmission to the UE 120. For example, the BS 110 may transmit the HARQ transmission to the UE 120 via a first beam (such as beam 0).

At 420, the UE 120 may obtain or receive the HARQ transmission from the BS 110. For example, the UE 120 may receive the HARQ transmission from the BS 110 via the first beam (such as beam 0). The UE 120 may process the HARQ transmission to try to decode the data included in the HARQ transmission. If the UE 120 can only successfully decode a portion of the HARQ transmission, the UE 120 may determine to transmit a NACK to the BS 110. If the UE 120 successfully decodes the complete HARQ transmission, the UE 120 may transmit an ACK to the BS 110.

At 425, the UE 120 may transmit a HARQ feedback, such as a NACK, to the BS 110 indicating that the UE 120 did not successfully decode the HARQ transmission. For example, the UE 120 may output the HARQ feedback for transmission to the BS 110. The NACK also may indicate which portion of the HARQ transmission the UE 120 did not successfully decode in order for the BS 110 to retransmit the pertinent portion of the HARQ transmission to the UE 120 via a HARQ retransmission.

At 430, the BS 110 may obtain or receive the HARQ feedback, such as the NACK, from the UE 120. The BS 110 may process the NACK to determine which portions of the HARQ transmission to retransmit to the UE 120 via a HARQ retransmission. The BS 110 also may determine whether to transmit the HARQ retransmission via the same beam (such as the first beam or beam 0) or via a different beam (such as a second beam or beam 2), as described in FIG. 3. In some implementations, the BS 110 may determine whether the BS 110 has already sent the HARQ retransmission beam indication during the connection establishment and configuration operations (according to the first option at 405), or whether the BS 110 should transmit the HARQ retransmission beam indication prior to or with the HARQ retransmission (according to the second option at 435).

At 435, the BS 110 may transmit the HARQ retransmission beam indication to the UE 120 prior to or with the corresponding HARQ retransmission, according to a second option (such as the second option at 435 in the message flow). For example, the BS 110 may transmit the HARQ retransmission beam indication via the DCI that is sent prior to or with the corresponding HARQ retransmission (such as the HARQ retransmission at 445).

At 440, the UE 120 may obtain or receive the HARQ retransmission beam indication via a DCI prior to or with a corresponding HARQ transmission (such as the HARQ retransmission at 445), according to the second option described at 435. Whether the UE 120 receives the HARQ retransmission beam indication via the first option (at 405) or the second option (at 435), the UE 120 may be informed which beam to look for the HARQ retransmission based on the HARQ retransmission beam indication.

At 445, if the BS 110 determines to transmit the HARQ retransmission via the same beam, the BS 110 may transmit the HARQ retransmission to the UE 120 via the first beam (such as beam 0).

At 450, if the BS 110 determines to transmit the HARQ retransmission via a different beam, the BS 110 may transmit the HARQ retransmission to the UE 120 via the second beam (such as beam 2). For example, the BS 110 may output the HARQ retransmission for transmission to the UE 120.

At 455, the UE 120 may obtain or receive the HARQ retransmission from the BS 110 via the same beam or via a different beam. The UE 120 may determine which beam to use for receiving the HARQ retransmission based on the HARQ retransmission beam indication.

FIG. 5 shows a diagram showing example HARQ retransmission beam indications that may be transmitted by a BS to a UE in order to implement a HARQ protocol using multiple beams.

In some implementations, the BS 110 may provide a HARQ retransmission beam indication 550 to the UE 120 indicating which beam the BS 110 will use to transmit a HARQ retransmission to the UE 120. As described in FIG. 4, in some implementations, the BS 110 may provide the HARQ retransmission beam indication 550 during connection establishment and configuration operations, according to a first option. For example, the BS 110 may transmit the HARQ retransmission beam indication 550 to the UE 120 via an RRC message. As another example, the BS 110 may transmit the HARQ retransmission beam indication 550 to the UE 120 via a MAC-CE message.

In some implementations, the HARQ retransmission beam indication 550 may include a beam connection map 555 that indicates a map of some or all available beams indicating which beams are used to transmit the HARQ retransmissions based on the beams that were used to transmit the original HARQ transmissions. This may be referred to as beam associations. As shown in the beam connection map 555, each "1" indicates that the beam association exists, and each "0" indices that the beam association exists. The rows indicate the beams that are available for the original or first HARQ transmission and the column indicate the beams that are available for the HARQ retransmission. As shown in the beam connection map 555, when the BS 110 transmits the first HARQ transmission via the Beam 0 and the Beam 3, the BS 110 will transmit the HARQ retransmission via a different beam. For example, when the BS 110 transmits the first HARQ transmission via the Beam 0, the beam connection map 555 indicates that the BS 110 will transmit the HARQ retransmission via the Beam 3, and when the BS 110 transmits the first HARQ transmission via the Beam 3, the beam connection map 555 indicates that the BS 110 will transmit the HARQ retransmission via the Beam 0. Also, the beam connection map 555 shows that when the BS 110 transmits the first HARQ transmission via the Beam 1 and the Beam 2, the BS 110 will transmit the HARQ retransmission via the same beam. For example, when the BS 110 transmits the first HARQ transmission via the Beam 1, the beam connection map 555 indicates that the BS 110 will transmit the HARQ retransmission via the Beam 1, and when the BS 110 transmits the first HARQ transmission via the Beam 2, the beam connection map 555 indicates that the BS 110 will transmit the HARQ retransmission via the Beam 2. In some implementations, the beam connection map 555 may include beam associations for both active and inactive beams. For example, the BS 110 may use beams that are active or inactive for HARQ transmissions and HARQ retransmissions, and thus the beam connection map 555 may include both active and inactive beams. In some implementations, the beam connection map 555 may be transmitted in various forms via the HARQ retransmission beam indication 550, such as using a beam connection bitmap or a beam connection index, among others.

As described in FIG. 4, in some implementations, the BS 110 may provide the HARQ retransmission beam indication 560 prior to or with the corresponding HARQ retransmission, according to a second option. For example, the BS 110 may transmit the HARQ retransmission beam indication 560 via a DCI that is sent prior to or with the corresponding HARQ retransmission. Since the HARQ retransmission beam indication 560 is transmitted prior to or with each of the HARQ retransmissions (according to Option 2), the HARQ retransmission beam indication 560 may only specify the beam that transmitted the first or original HARQ transmission and the beam that will transmit the corresponding HARQ retransmission. For example, the HARQ retransmission beam indication 560 may include beam connection information 565 that indicates the beam that transmitted the first or original HARQ transmission and the beam that will transmit the corresponding HARQ retransmission. For example, the beam connection information 565 may be one or more bits of the DCI or may be a beam connection index that is included in the DCI.

FIG. 6 shows an example message flow that shows a UE, a first BS, and a second BS that are configured to implement a HARQ protocol using multiple beams from different BSs. The message flow diagram 600 includes the UE 120, the BS 110, and the BS 111 that are described in FIG. 3.

At 605, the BS 110 may provide a HARQ retransmission beam indication to the UE 120 indicating which beam the BS 110 will use to transmit a HARQ retransmission to the UE 120. In some implementations, the BS 110 may provide the HARQ retransmission beam indication during connection establishment and configuration operations. For example, the BS 110 may transmit the HARQ retransmission beam indication to the UE 120 via an RRC message. As another example, the BS 110 may transmit the HARQ retransmission beam indication to the UE 120 via a MAC- CE message. In some implementations, the BS 110 may transmit the HARQ retransmission beam indication periodically or aperiodically.

At 610, the UE 120 may obtain or receive, process, and store the HARQ retransmission beam indication. If the HARQ retransmission beam indication has changed, the UE 120 may process and store the updated HARQ retransmission beam indication. In some implementations, the UE 120 may receive the HARQ retransmission beam indication via an RRC message or a MAC-CE message periodically or aperiodically.

At 615, the BS 110 may transmit the HARQ transmission to the UE 120. For example, the BS 110 may output the HARQ transmission for transmission to the UE 120. For example, the BS 110 may transmit the HARQ transmission to the UE 120 via a first beam (such as beam 0).

At 620, the UE 120 may obtain or receive the HARQ transmission from the BS 110. For example, the UE 120 may receive the HARQ transmission from the BS 110 via the first beam (such as beam 0). The UE 120 may process the HARQ transmission to try to decode the data included in the HARQ transmission. If the UE 120 can only successfully decode a portion of the HARQ transmission, the UE 120 may determine to transmit a NACK to the BS 110. If the UE 120 successfully decodes the complete HARQ transmission, the UE 120 may transmit an ACK to the BS 110.

At 625, the UE 120 may transmit a HARQ feedback, such as a NACK, to the BS 110 indicating that the UE 120 did not successfully decode the HARQ transmission. For example, the UE 120 may output the HARQ feedback for transmission to the BS 110. The NACK also may indicate which portion of the HARQ transmission the UE 120 did not successfully decode in order for the BS 110 to retransmit the pertinent portion of the HARQ transmission to the UE 120 via a HARQ retransmission.

At 630, the BS 110 may obtain or receive the HARQ feedback, such as the NACK, from the UE 120. The BS 110 may process the NACK to determine which portions of the HARQ transmission to retransmit to the UE 120 via a HARQ retransmission. In some implementations, the BS 110 may determine whether the BS 110 should transmit the HARQ retransmission to the UE 120 or whether a different BS, such as the BS 111, should transmit the HARQ retransmission, as described in FIG. 3. If the BS 110 determines the BS 110 should transmit the HARQ retransmission, the BS 110 may determine whether to transmit the HARQ retransmission via the same beam (such as the first beam or beam 0) or via a different beam (such as a second beam or beam 2). If the BS 110 determines that a different BS, such as the BS 111, should transmit the HARQ retransmission, the BS 110 may perform a handoff from the BS 110 to the BS 111 so that the BS 111 can handle the HARQ retransmission.

At 635, the BS 110 may transmit a handoff message to the BS 111 to initiate the handoff from the BS 110 to the BS 111. For example, the BS 110 may output the handoff message for transmission to the BS 111.

At 640, the BS 111 may obtain or receive the handoff message from the BS 110. The BS 111 may determine that the handoff message indicates that the BS 111 will handle transmitting the HARQ retransmission to the UE 120. In some implementations, the BS 111 may exchange handoff-related messages with the UE 120 in order to perform the handoff from the BS 110 to the BS 111. In some implementations, the BS 111 also may determine which beam to use to transmit the HARQ retransmission to the UE 120. For example, the BS 111 may perform similar operations as described in FIG. 3 to determine which beam to use for the HARQ retransmission. For example, the BS 111 may determine which beam to use for the HARQ retransmission based on beam-specific conditions associated with the available beams. In some implementations, the BS 111 also may provide a HARQ retransmission beam indication to the UE 120 to indicate which beam the BS 111 will use to transmit the HARQ retransmission.

At 645, the BS 111 may transmit the HARQ retransmission to the UE 120 via one of the available beams. For example, the BS 111 may output the HARQ retransmission for transmission to the UE 120.

At 650, the UE 120 may obtain or receive and process the HARQ retransmission from the BS 111.

FIG. 7 depicts a flowchart 700 with example operations performed by an apparatus of a UE for implementing a HARQ protocol using multiple beams.

At block 710, the apparatus of the UE may obtain a first HARQ transmission from a first BS of a WWAN via a first beam of a plurality of beams.

At block 720, the apparatus of the UE may output a HARQ feedback for transmission to the first BS. The HARQ feedback may indicate to retransmit at least a portion of the first HARQ transmission.

At block 730, the apparatus of the UE may obtain a HARQ retransmission associated with the first HARQ transmission via a second beam of the plurality of beams. The second beam may be different than the first beam.

FIG. 8 depicts a flowchart 800 with example operations performed by an apparatus of a BS for implementing a HARQ protocol using multiple beams.

At block 810, the apparatus of the BS may output a first HARQ transmission for transmission to a UE of a WWAN via a first beam of a plurality of beams.

At block 820, the apparatus of the BS may obtain a first HARQ feedback from the UE. The first HARQ feedback may indicate to retransmit at least a portion of the first HARQ message.

At block 830, the apparatus of the BS may output a HARQ retransmission associated with the first HARQ transmission for transmission to the UE via a second beam of the plurality of beams. The second beam may be different than the first beam.

Figure 9:
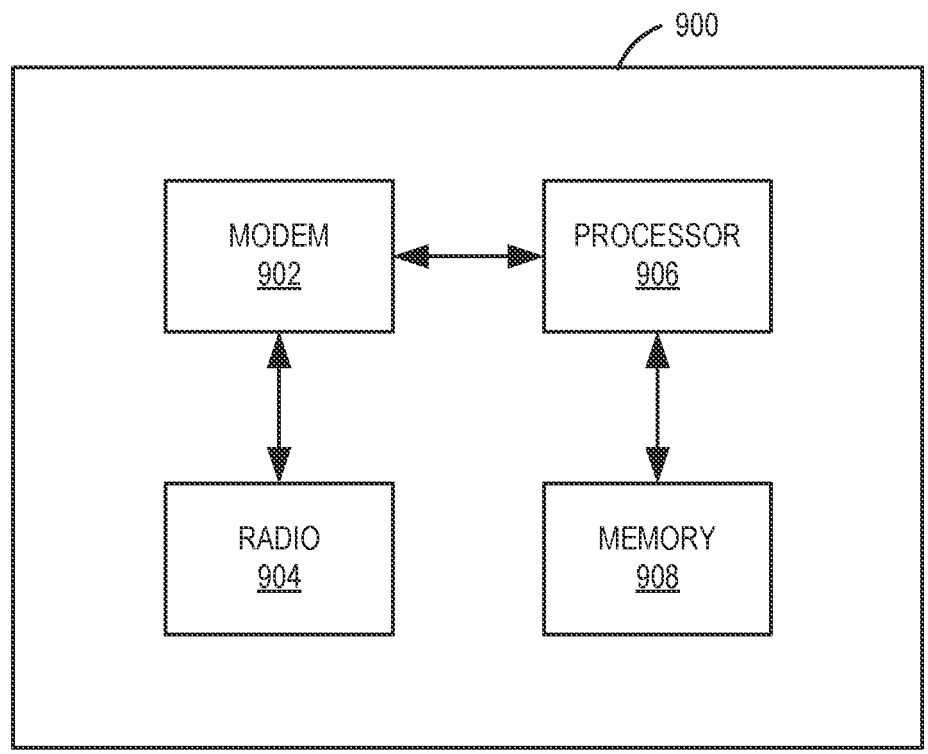
FIG. 9 shows a block diagram of an example wireless communication apparatus.

FIG. 9 shows a block diagram of an example wireless communication apparatus 900. In some implementations, the wireless communication apparatus 900 can be an example of a device for use in a UE, such as the UE 120 described with reference to FIG. 3. In some implementations, the wireless communication apparatus 900 can be an example of a device for use in a BS, such as the BS 110 described with reference to FIG. 3. The wireless communication apparatus 900 is capable of transmitting (or outputting for transmission) and receiving wireless communications.

The wireless communication apparatus 900 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 900 may include one or more modems 902. In some implementations, the one or more modems 902 (collectively "the modem 902") may include a WWAN modem (for example, a 3GPP 4G LTE or 5G compliant modem). In some implementations, the wireless communication apparatus 900 also includes one or more radios 904 (collectively "the radio 904"). In some implementations, the wireless communication apparatus 900 further includes one or more processors, processing blocks or processing elements 906 (collectively "the processor 906") and one or more memory blocks or elements 908 (collectively "the memory 908").

The modem 902 can include an intelligent hardware block or device such as, for example, an application-specific integrated circuit (ASIC) among other possibilities. The modem 902 is generally configured to implement a PHY layer. For example, the modem 902 is configured to modulate packets and to output the modulated packets to the radio 904 for transmission over the wireless medium. The modem 902 is similarly configured to obtain modulated packets received by the radio 904 and to demodulate the packets to provide demodulated packets. In addition to a modulator and a demodulator, the modem 902 may further include digital signal processing (DSP) circuitry, automatic gain control (AGC), a coder, a decoder, a multiplexer and a demultiplexer. For example, while in a transmission mode, data obtained from the processor 906 is provided to a coder, which encodes the data to provide encoded bits. The encoded bits are mapped to points in a modulation constellation (using a selected MCS) to provide modulated symbols. The modulated symbols may be mapped to a number NS S of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 904. In implementations involving beamforming, the modulated symbols in the respective spatial streams are precoded via a steering matrix prior to their provision to the IFFT block.

While in a reception mode, digital signals received from the radio 904 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 906) for processing, evaluation, or interpretation.

The radio 904 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 900 can include, or be coupled with, multiple transmit antennas (each with a corresponding transmit chain) and multiple receive antennas (each with a corresponding receive chain). The symbols output from the modem 902 are provided to the radio 904, which transmits the symbols via the coupled antennas. Similarly, symbols received via the antennas are obtained by the radio 904, which provides the symbols to the modem 902.

The processor 906 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 906 processes information received through the radio 904 and the modem 902, and processes information to be output through the modem 902 and the radio 904 for transmission through the wireless medium. In some implementations, the processor 906 may generally control the modem 902 to cause the modem to perform various operations described throughout.

The memory 908 can include tangible storage media such as random-access memory (RAM) or read-only memory (ROM), or combinations thereof. The memory 908 also can store non-transitory processor- or computer-executable software (SW) code containing instructions that, when executed by the processor 906, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 906 and the memory 908 of the wireless communication device 900 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 906, the memory 908, and one or more other components of the wireless communication device 900, such as the modem 902.

In some implementations, the processing system of a UE 120 may interface with other components of the UE 120, and may process information received from other components (such as inputs or signals), output information to other components, etc. For example, a chip or modem of the UE 120 (such as the wireless communication device 900) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication device 900) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 10:
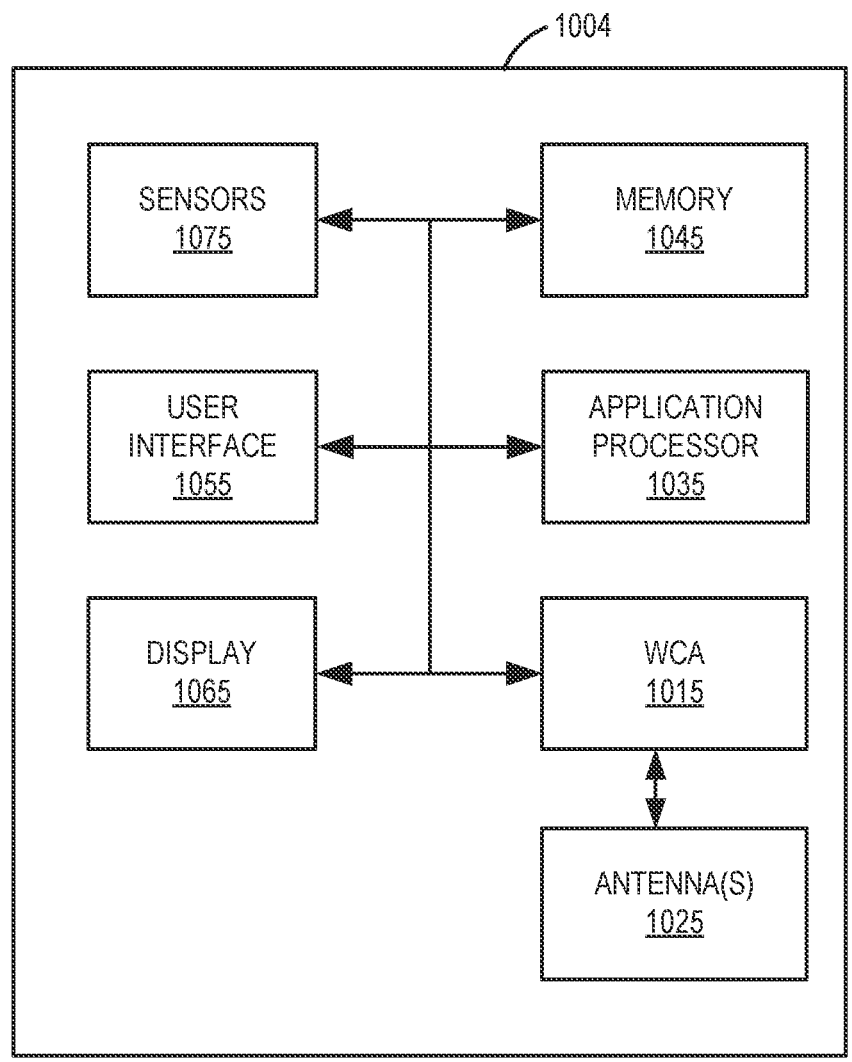
FIG. 10 shows a block diagram of an example mobile communication device.

FIG. 10 shows a block diagram of an example mobile communication device 1004. For example, the mobile communication device 1004 can be an example implementation of the UE 120 described herein. The mobile communication device 1004 includes a wireless communication apparatus (WCA) 1015. For example, the WCA 1015 may be an example implementation of the wireless communication apparatus 900 described with reference to FIG. 9. The mobile communication device 1004 also includes one or more antennas 1025 coupled with the WCA 1015 to transmit and receive wireless communications. The mobile communication device 1004 additionally includes an application processor 1035 coupled with the WCA 1015, and a memory 1045 coupled with the application processor 1035. In some implementations, the mobile communication device 1004 further includes a UI 1055 (such as a touchscreen or keypad) and a display 1065, which may be integrated with the UI 1055 to form a touchscreen display. In some implementations, the mobile communication device 1004 may further include one or more sensors 1075 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1004 further includes a housing that encompasses the WCA 1015, the application processor 1035, the memory 1045, and at least portions of the antennas 1025, UI 1055, and display 1065.

FIGS. 1-10 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One innovative aspect of the subject matter described in this disclosure can be implemented in a method for wireless communication performed by an apparatus of a UE for implementing a HARQ protocol. The method may include obtaining a first HARQ transmission from a first BS of a WWAN via a first beam of a plurality of beams, and outputting a HARQ feedback for transmission to the first BS. The HARQ feedback may indicate to retransmit at least a portion of the first HARQ transmission. The method may include obtaining a HARQ retransmission associated with the first HARQ transmission via a second beam of the plurality of beams. The second beam may be different than the first beam.

Clause 2. The method of clause 1, where the HARQ retransmission may be obtained from the first BS via the second beam.

Clause 3. The method of any one or more of clauses 1-2, where the HARQ retransmission may be obtained from a second BS of the WWAN via the second beam.

Clause 4. The method of any one or more of clauses 1-3, where the HARQ feedback may be a NACK indicating to retransmit at least a portion of the first HARQ transmission.

Clause 5. The method of any one or more of clauses 1-4, further including obtaining a HARQ retransmission beam indication from the first BS. The HARQ retransmission beam indication may indicate that the HARQ retransmission will be provided to the UE via the second beam.

Clause 6. The method of any one or more of clauses 1-5, where the HARQ retransmission beam indication may be obtained from the first BS via a DCI associated with the first HARQ transmission.

Clause 7. The method of any one or more of clauses 1-6, where the HARQ retransmission beam indication may be obtained from the first BS via an RRC message.

Clause 8. The method of any one or more of clauses 1-7, where the HARQ retransmission beam indication is obtained from the first BS via a MAC-CE message.

Clause 9. The method of any one or more of clauses 1-8, where the HARQ retransmission beam indication may further indicate whether the HARQ retransmission will be provided to the UE via the second beam from the first BS or from a second BS.

Clause 10. The method of any one or more of clauses 1-9, where the HARQ retransmission beam indication may include a beam indicator associated with the second beam to indicate that the HARQ retransmission will be provided to the UE via the second beam.

Clause 11. The method of any one or more of clauses 1-10, where the HARQ retransmission beam indication may further include a beam indicator associated with the first beam to indicate that the first HARQ transmission was provided to the UE via the first beam.

Clause 12. The method of any one or more of clauses 1-11, where the HARQ retransmission may include a TB indicator to indicate which TB the BS used to transmit the first HARQ transmission to the UE. The method further including obtaining the HARQ retransmission from the second beam based, at least in part, on the HARQ retransmission beam indication and the TB indicator.

Clause 13. The method of any one or more of clauses 1-12, where the apparatus of the UE and the first BS may be configured to implement the HARQ protocol using a 5G NR RAT.

Clause 14. Another innovative aspect of the subject matter described in this disclosure can be implemented in a method for wireless communication performed by an apparatus of a BS for implementing a HARQ protocol. The method may include outputting a first HARQ transmission for transmission to a UE of a WWAN via a first beam of a plurality of beams, and obtaining a first HARQ feedback from the UE. The first HARQ feedback may indicate to retransmit at least a portion of the first HARQ transmission. The method may include outputting a HARQ retransmission associated with the first HARQ transmission for transmission to the UE via a second beam of the plurality of beams. The second beam may be different than the first beam.

Clause 15. The method of clause 14, further including determining whether to transmit the HARQ retransmission associated with the first HARQ transmission via the first beam or the second beam based, at least in part, on beam-specific conditions, and outputting the HARQ retransmission for transmission to the UE via the second beam in response to determining to transmit the HARQ retransmission via the second beam based, at least in part, on the beam-specific conditions.

Clause 16. The method of any one or more of clauses 14-15, where the beam-specific conditions may include one or more of an SINR associated with each of the plurality of beams, an RSRP associated with each of the plurality of beams, channel conditions associated with each of the plurality of beams, diversity conditions associated with each of the plurality of beams, a rate of transmission associated with the first HARQ transmission transmitted via the first beam, one or more additional HARQ feedbacks obtained via one or more of the plurality of beams, and transmissions obtained by the first BS from other UEs in the WWAN via one or more of the plurality of beams.

Clause 17. The method of any one or more of clauses 14-16, where the first HARQ feedback may be a NACK indicating to retransmit at least a portion of the first HARQ transmission.

Clause 18. The method of any one or more of clauses 14-17, further including outputting a HARQ retransmission beam indication for transmission to the UE. The HARQ retransmission beam indication may indicate that the HARQ retransmission will be provided to the UE via the second beam.

Clause 19. The method of any one or more of clauses 14-18, where the HARQ retransmission beam indication may be output from the first BS for transmission to the UE via a DCI associated with the first HARQ transmission.

Clause 20. The method of any one or more of clauses 14-19, where the HARQ retransmission beam indication may be output from the first BS for transmission to the UE via an RRC message or an MAC-CE message.

Clause 21. The method of any one or more of clauses 14-20, further including outputting a second HARQ transmission for transmission to the UE via the first beam of the plurality of beams and obtaining a second HARQ feedback from the UE. The second HARQ feedback may indicate to retransmit at least a portion of the second HARQ transmission. The method further including determining whether to transmit a second HARQ retransmission associated with the second HARQ transmission from the first BS to the UE via the first beam or from a second BS to the UE via a third beam based, at least in part, on beam-specific conditions.

Clause 22. The method of any one or more of clauses 14-21, further including, in response to determining to transmit the second HARQ retransmission associated with the second HARQ transmission from the second BS to the UE via the third beam, outputting a HARQ handover indication for transmission to the second BS. The HARQ handover indication may indicate to the second BS to transmit the second HARQ retransmission associated with the second HARQ transmission to the UE via the third beam.

Clause 23. The method of any one or more of clauses 14-22, further including, in response to outputting the HARQ retransmission associated with the first HARQ transmission for transmission to the UE via the second beam of the plurality of beams, outputting a second HARQ transmission for transmission via the first beam. The second HARQ transmission may have new data.

Clause 24. Another innovative aspect of the subject matter described in this disclosure can be implemented in an apparatus of a BS. The apparatus of the BS may include one or more processors and one or more interfaces. The one or more processors may be configured to implement a HARQ protocol. The one or more interfaces may be configured to output a first HARQ transmission for transmission to a UE of a WWAN via a first beam of a plurality of beams, obtain a first HARQ feedback from the UE, the first HARQ feedback indicating to retransmit at least a portion of the first HARQ transmission, and output a HARQ retransmission associated with the first HARQ transmission for transmission to the UE via a second beam of the plurality of beams. The second beam may be different than the first beam.

Clause 25. The apparatus of any one or more of clauses 2-13 and 24, where the one or more processors may be configured to determine whether to transmit the HARQ retransmission associated with the first HARQ transmission via the first beam or the second beam based, at least in part, on beam-specific conditions. The one or more interfaces may be configured to output the HARQ retransmission for transmission to the UE via the second beam in response to a determination to transmit the HARQ retransmission via the second beam based, at least in part, on the beam-specific conditions.

Clause 26. The apparatus of any one or more of clauses 2-13 and 24-25, where the beam-specific conditions may include one or more of an SINR associated with each of the plurality of beams, an RSRP associated with each of the plurality of beams, channel conditions associated with each of the plurality of beams, diversity conditions associated with each of the plurality of beams, a rate of transmission associated with the first HARQ transmission transmitted via the first beam, one or more additional HARQ feedbacks obtained via one or more of the plurality of beams, and transmissions obtained by the first BS from other UEs in the WWAN via one or more of the plurality of beams.

Clause 27. The apparatus of any one or more of clauses 2-13 and 24-26, where the one or more interfaces may be configured to output a HARQ retransmission beam indication for transmission to the UE. The HARQ retransmission beam indication may indicate that the HARQ retransmission will be provided to the UE via the second beam.

Clause 28. Another innovative aspect of the subject matter described in this disclosure can be implemented in an apparatus of a UE. The apparatus of the UE may include one or more processors and one or more interfaces. The one or more processors may be configured to implement a HARQ protocol. The one or more interfaces may be configured to obtain a first HARQ transmission from a first BS of a WWAN via a first beam of a plurality of beams, output a HARQ feedback for transmission to the first BS, the HARQ feedback indicating to retransmit at least a portion of the first HARQ transmission, and obtain a HARQ retransmission associated with the first HARQ transmission via a second beam of the plurality of beams. The second beam may be different than the first beam.

Clause 29. The apparatus of any one or more of clauses 15-23 and 28, where the HARQ retransmission may be obtained from the first BS or from a second BS via the second beam.

Clause 30. The apparatus of any one or more of clauses 15-23 and 28-29, where the one or more interfaces may be configured to obtain a HARQ retransmission beam indication from the first BS. The HARQ retransmission beam indication may indicate that the HARQ retransmission will be provided to the UE via the second beam.

Another innovative aspect of the subject matter described in this disclosure can be implemented as an apparatus of a UE or an apparatus of a BS for wireless communications. The apparatus may include one or more interfaces and one or more processors configured to perform any one of the above-mentioned methods or featured described herein.

Another innovative aspect of the subject matter described in this disclosure can be implemented as a non-transitory computer-readable medium having stored therein instructions which, when executed by one or more processors of a UE, cause the UE to perform any one of the above-mentioned methods or features described herein.

Another innovative aspect of the subject matter described in this disclosure can be implemented as a non-transitory computer-readable medium having stored therein instructions which, when executed by one or more processors of a BS, cause the BS to perform any one of the above-mentioned methods or features described herein.

Another innovative aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by an apparatus of a user equipment (UE) for implementing a hybrid automatic repeat request (HARQ) protocol, comprising:

obtaining a first HARQ transmission from a first base station (BS) of a wireless wide area network (WWAN) via a first beam of a plurality of beams;

outputting a HARQ feedback for transmission to the first BS, the HARQ feedback indicating to retransmit at least a portion of the first HARQ transmission;

obtaining a HARQ retransmission beam indication from the first BS, the HARQ retransmission beam indication indicating that a HARQ retransmission will be provided to the UE via a second beam, the HARQ retransmission beam indication comprising a beam indicator associated with the second beam to indicate that the HARQ retransmission will be provided to the UE via the second beam; and obtaining the HARQ retransmission associated with the first HARQ transmission via the second beam of the plurality of beams, the second beam being different than the first beam.

2. The method of claim 1, wherein the HARQ retransmission is obtained from the first BS via the second beam.

3. The method of claim 1, wherein the HARQ retransmission is obtained from a second BS of the WWAN via the second beam.

4. The method of claim 1, wherein the HARQ feedback is a negative acknowledgement (NACK) indicating to retransmit at least a portion of the first HARQ transmission.

5. The method of claim 1, wherein the HARQ retransmission beam indication is obtained from the first BS via a Downlink Control Information (DCI) associated with the first HARQ transmission.

6. The method of claim 1, wherein the HARQ retransmission beam indication is obtained from the first BS via a Radio Resource Control (RRC) message.

7. The method of claim 1, wherein the HARQ retransmission beam indication is obtained from the first BS via a Media Access Control (MAC) Control Element (CE) message.

8. The method of claim 1, wherein the HARQ retransmission beam indication further indicates whether the HARQ retransmission will be provided to the UE via the second beam from the first BS or from a second BS.

9. The method of claim 1, wherein the HARQ retransmission beam indication further includes a beam indicator associated with the first beam to indicate that the first HARQ transmission was provided to the UE via the first beam.

10. The method of claim 1, wherein the HARQ retransmission includes a Transport Block (TB) indicator to indicate which TB the BS used to transmit the first HARQ transmission to the UE, further comprising:

obtaining the HARQ retransmission from the second beam in accordance with the HARQ retransmission beam indication and the TB indicator.

11. The method of claim 1, wherein the apparatus of the UE and the first BS are configured to implement the HARQ protocol using a 5G New Radio (NR) radio access technology (RAT).

12. The method of claim 1, wherein the HARQ retransmission beam indication is output from the first BS for transmission to the UE via a Downlink Control Information (DCI) associated with the first HARQ transmission.

13. The method of claim 1, wherein the HARQ retransmission beam indication is output from the first BS for transmission to the UE via a Radio Resource Control (RRC) message or a Media Access Control (MAC) Control Element (CE) message.

14. A method for wireless communication performed by an apparatus of a first base station (BS) for implementing a hybrid automatic repeat request (HARQ) protocol, comprising:

outputting a first HARQ transmission for transmission to a UE of a wireless wide area network (WWAN) via a first beam of a plurality of beams;

obtaining a first HARQ feedback from the UE, the first HARQ feedback indicating to retransmit at least a portion of the first HARQ transmission;

outputting a HARQ retransmission associated with the first HARQ transmission; and outputting a HARQ retransmission beam indication for transmission, the HARQ retransmission beam indication indicating that the HARQ retransmission will be provided to the UE via a second beam of the plurality of beams, the second beam being different than the first beam, the HARQ retransmission beam indication comprising a beam indicator associated with the second beam to indicate that the HARQ retransmission will be provided to the UE via the second beam.

15. The method of claim 14, further comprising:

determining whether to transmit the HARQ retransmission associated with the first HARQ transmission via the first beam or the second beam in accordance with beam-specific conditions, wherein outputting the HARQ retransmission for transmission to the UE via the second beam is in response to determining to transmit the HARQ retransmission via the second beam in accordance with the beam-specific conditions.

16. The method of claim 15, wherein the beam-specific conditions include one or more of:

a signal-to-interference-plus-noise ratio (SINR) associated with each of the plurality of beams;

a reference signal receive power (RSRP) associated with each of the plurality of beams;

channel conditions associated with each of the plurality of beams;

diversity conditions associated with each of the plurality of beams;

a rate of transmission associated with the first HARQ transmission transmitted via the first beam;

one or more additional HARQ feedbacks obtained via one or more of the plurality of beams; and transmissions obtained by the first BS from other UEs in the WWAN via one or more of the plurality of beams.

17. The method of claim 14, wherein the first HARQ feedback is a negative acknowledgement (NACK) indicating to retransmit at least a portion of the first HARQ transmission.

18. The method of claim 14, further comprising:

outputting the HARQ retransmission beam indication for transmission to the UE.

19. The method of claim 14, further comprising:

outputting a second HARQ transmission for transmission to the UE via the first beam of the plurality of beams;

obtaining a second HARQ feedback from the UE, the second HARQ feedback indicating to retransmit at least a portion of the second HARQ transmission; and determining whether to transmit a second HARQ retransmission associated with the second HARQ transmission from the first BS to the UE via the first beam or from a second BS to the UE via a third beam in accordance with beam-specific conditions.

20. The method of claim 19, further comprising:

in response to determining to transmit the second HARQ retransmission associated with the second HARQ transmission from the second BS to the UE via the third beam; and outputting a HARQ handover indication for transmission to the second BS, the HARQ handover indication indicating to the second BS to transmit the second HARQ retransmission associated with the second HARQ transmission to the UE via the third beam.

21. The method of claim 14, further comprising:

in response to outputting the HARQ retransmission associated with the first HARQ transmission for transmission to the UE via the second beam of the plurality of beams; and outputting a second HARQ transmission for transmission via the first beam, the second HARQ transmission having new data.

22. An apparatus of a base station (BS) for wireless communication, comprising:

one or more processors configured to implement a hybrid automatic repeat request (HARQ) protocol; and one or more interfaces configured to:

output a first HARQ transmission for transmission to a UE of a wireless wide area network (WWAN) via a first beam of a plurality of beams;

obtain a first HARQ feedback from the UE, the first HARQ feedback indicating to retransmit at least a portion of the first HARQ transmission;

output a HARQ retransmission associated with the first HARQ transmission; and output a HARQ retransmission beam indication for transmission, the HARQ retransmission beam indication indicating that the HARQ retransmission will be provided to the UE via a second beam of the plurality of beams, the second beam being different than the first beam, the HARQ retransmission beam indication comprising a beam indicator associated with the second beam to indicate that the HARQ retransmission will be provided to the UE via the second beam.

23. The apparatus of claim 22, wherein:

the one or more processors are configured to determine whether to transmit the HARQ retransmission associated with the first HARQ transmission via the first beam or the second beam in accordance with beam-specific conditions; and the one or more interfaces are configured to output the HARQ retransmission for transmission to the UE via the second beam in response to a determination to transmit the HARQ retransmission via the second beam in accordance with the beam-specific conditions.

24. The apparatus of claim 23, wherein the beam-specific conditions include one or more of:

a signal-to-interference-plus-noise ratio (SINK) associated with each of the plurality of beams;

a reference signal receive power (RSRP) associated with each of the plurality of beams;

channel conditions associated with each of the plurality of beams;

diversity conditions associated with each of the plurality of beams;

a rate of transmission associated with the first HARQ transmission transmitted via the first beam;

one or more additional HARQ feedbacks obtained via one or more of the plurality of beams; and transmissions obtained by the first BS from other UEs in the WWAN via one or more of the plurality of beams.

25. The apparatus of claim 22, wherein:

the one or more interfaces are configured to output the HARQ retransmission beam indication for transmission to the UE.

26. An apparatus of a user equipment (UE) for wireless communication, comprising:
   one or more processors configured to implement a hybrid automatic repeat request (HARQ) protocol; and
   one or more interfaces configured to:
      obtain a first HARQ transmission from a first base station (BS) of a wireless wide area network (WWAN) via a first beam of a plurality of beams;
      output a HARQ feedback for transmission to the first BS, the HARQ feedback indicating to retransmit at least a portion of the first HARQ transmission;
      obtain a HARQ retransmission beam indication from the first BS, the HARQ retransmission beam indication indicating that a HARQ retransmission will be provided to the UE via a second beam, the HARQ retransmission beam indication comprising a beam indicator associated with the second beam to indicate that the HARQ retransmission will be provided to the UE via the second beam; and
      obtain the HARQ retransmission associated with the first HARQ transmission via the second beam of the plurality of beams, the second beam being different than the first beam.

27. The apparatus of claim 26, wherein the HARQ retransmission is obtained from the first BS or from a second BS via the second beam.

* * * * *